(12) United States Patent
Sato et al.

(10) Patent No.: US 10,290,883 B2
(45) Date of Patent: May 14, 2019

(54) FUEL CELL SYSTEM AND METHOD OF CONTROL OF SAME

(71) Applicant: TOYOTA JIDOSHA KABUSHIKI KAISHA, Toyota-shi, Aichi (JP)

(72) Inventors: Hiromichi Sato, Hadano (JP); Shigeki Hasegawa, Susono (JP); Atsuo Iio, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 112 days.

(21) Appl. No.: 15/501,366

(22) PCT Filed: Feb. 12, 2016

(86) PCT No.: PCT/JP2016/054169
§ 371 (c)(1),
(2) Date: Feb. 2, 2017

(87) PCT Pub. No.: WO2016/163149
PCT Pub. Date: Oct. 13, 2016

(65) Prior Publication Data
US 2017/0229723 A1    Aug. 10, 2017

(30) Foreign Application Priority Data
Apr. 10, 2015    (JP) .................. 2015-081272

(51) Int. Cl.
*H01M 8/04* (2016.01)
*H01M 8/04302* (2016.01)
(Continued)

(52) U.S. Cl.
CPC ... *H01M 8/04302* (2016.02); *H01M 8/04029* (2013.01); *H01M 8/04074* (2013.01);
(Continued)

(58) Field of Classification Search
CPC ......... H01M 8/04302; H01M 8/04225; H01M 8/04029; H01M 8/04074; H01M 2250/20
See application file for complete search history.

(56) References Cited

U.S. PATENT DOCUMENTS

2005/0077252 A1*  4/2005  Shih .................. H01M 8/04029
                                                210/767
2012/0115058 A1*  5/2012  Darling ............... H01M 8/0432
                                                429/432

FOREIGN PATENT DOCUMENTS

JP    2003-346845 A    12/2003
JP    2004-152666 A    5/2004
(Continued)

*Primary Examiner* — Renee S Luebke
*Assistant Examiner* — Paul D Baillargeon
(74) *Attorney, Agent, or Firm* — Hunton Andrews Kurth LLP

(57) ABSTRACT

A fuel cell system comprises a fuel cell stack, radiator, cooling water feed passage, cooling water discharge passage, bypass cooling water passage, deionizer, stack side cooling water pump, radiator side cooling water pump, and bypass cooling water control valve. The radiator side cooling water pump and bypass cooling water control valve are controlled to selectively perform one of a stack flow through mode where cooling water flows through at least the fuel cell stack and a stack bypass mode where cooling water does not substantially flow through the fuel cell stack but circulates through the radiator and the bypass cooling water passage.

11 Claims, 16 Drawing Sheets

(51) Int. Cl.
  *H01M 8/04225* (2016.01)
  *H01M 8/04029* (2016.01)
  *H01M 8/04007* (2016.01)
  *H01M 8/04537* (2016.01)
  *H01M 8/1018* (2016.01)

(52) U.S. Cl.
  CPC ... *H01M 8/04225* (2016.02); *H01M 8/04656* (2013.01); *H01M 2008/1095* (2013.01); *H01M 2250/20* (2013.01); *Y02T 90/32* (2013.01)

(56) References Cited

FOREIGN PATENT DOCUMENTS

| | | |
|---|---|---|
| JP | 2005-129448 A | 5/2005 |
| JP | 2005-259528 A | 9/2005 |
| JP | 2007-311087 A | 11/2007 |
| JP | 2010-186647 A | 8/2010 |
| JP | 2013-229140 A | 11/2013 |
| JP | 2014-157832 A | 8/2014 |

\* cited by examiner

FUEL CELL SYSTEM AND METHOD OF CONTROL OF SAME

CROSS-REFERENCE TO RELATED APPLICATIONS

This is a national phase application based on the PCT International Patent Application No. PCT/JP2016/054169 filed Feb. 12, 2016, claiming priority to Japanese Patent Application No. 2015-081272 filed Apr. 10, 2015, the entire contents of both of which are incorporated herein by reference.

TECHNICAL FIELD

The present invention relates to a fuel cell system and a control method of the same.

BACKGROUND ART

A fuel cell system is known in the art, which includes a fuel cell stack configured to generate electric power by an electrochemical reaction of a fuel gas and an oxidant gas, a radiator configured to lower a temperature of cooling water for the fuel cell stack, a cooling water feed passage connecting an outlet of a radiator inside cooling water passage in the radiator and an inlet of a stack inside cooling water passage in the fuel cell stack together, the cooling water feed passage including a feed side branching point, a radiator outflow passage from the outlet of the radiator inside cooling water passage to the feed side branching point and a stack inflow passage from the feed side branching point to the inlet of the stack inside cooling water passage, a cooling water discharge passage connecting an outlet of the stack inside cooling water passage and an inlet of the radiator inside cooling water passage, the cooling water discharge passage including a discharge side branching point, a stack outflow passage from the outlet of the stack inside cooling water passage to the discharge side branching point, and a radiator inflow passage from the discharge side branching point to the inlet of the radiator inside cooling water passage, a bypass cooling water passage connecting the feed side branching point and the discharge side branching point together, the bypass cooling water passage including a deionizer configured to remove ions in the cooling water, a cooling water pump arranged in the radiator outflow passage so that an inlet thereof faces the radiator, and a bypass cooling water control valve controlling an amount of cooling water flowing through the bypass cooling water passage, in which the cooling water pump is driven and the bypass cooling water control valve is controlled so that part of the cooling water having flowed through the radiator outflow passage flows through the bypass cooling water passage and the remainder flows through the stack inside cooling water passage of the fuel cell stack (for example, see PLT 1). Ions are eluted into the cooling water from the radiator etc. As a result, an electrical conductivity of the cooling water increases. In this regard, if cooling water with an excessively high electrical conductivity flows into the fuel cell stack, the fuel cell stack is liable to fall in electrical insulating ability. In the fuel cell system of PLT 1, part of the cooling water always flows through the deionizer and, thus, the cooling water is lowered in electrical conductivity. Therefore, the ability to electrically insulate the fuel cell stack is less reduced. Note that, in the fuel cell system of PLT 1, the remaining cooling water always flows through the fuel cell stack.

CITATION LIST

Patent Literature

PLT 1: Japanese Patent Publication No. 2007-311087A

SUMMARY OF INVENTION

Technical Problem

In this regard, while power generation at the fuel cell stack is stopped, ions are gradually eluted into the cooling water from the radiator. Thus, if a time during which power generation of the fuel cell stack is stopped becomes long, the cooling water in the radiator is liable to become excessively high in electrical conductivity.

In this regard, in the fuel cell system of PLT 1, as will be understood from the above explanation, if the cooling water pump is driven, part of the cooling water flowing out from the radiator will necessarily flow into the fuel cell stack. As a result, at the time of start of power generation at the fuel cell system, cooling water with an excessively high electrical conductivity is liable to flow into the fuel cell stack.

Solution to Problem

According to one aspect of the present invention, there is provided a fuel cell system comprising: a fuel cell stack configured to generate electric power by an electrochemical reaction of a fuel gas and an oxidant gas; a radiator configured to lower a temperature of cooling water for the fuel cell stack; a cooling water feed passage connecting an outlet of a radiator inside cooling water passage in the radiator and an inlet of a stack inside cooling water passage in the fuel cell stack together and a cooling water discharge passage connecting an outlet of the stack inside cooling water passage and an inlet of the radiator inside cooling water passage together, the cooling water feed passage comprising a feed side branching point, a radiator outflow passage from the outlet of the radiator inside cooling water passage to the feed side branching point, and a stack inflow passage from the feed side branching point to the inlet of the stack inside cooling water passage, the cooling water discharge passage comprising a discharge side branching point, a stack outflow passage from the outlet of the stack inside cooling water passage to the discharge side branching point, and a radiator inflow passage from the discharge side branching point to the inlet of the radiator inside cooling water passage, the stack inflow passage, the stack inside cooling water passage, and the stack outflow passage forming a stack side cooling water passage, and the radiator inflow passage, the radiator inside cooling water passage, and the radiator outflow passage forming a radiator side cooling water passage; a bypass cooling water passage connecting the feed side branching point and the discharge side branching point together, the bypass cooling water passage comprising a deionizer configured to remove ions in the cooling water; a radiator side cooling water pump arranged in the radiator inflow passage so that an outlet thereof faces the radiator or arranged in the radiator outflow passage so that an inlet thereof faces the radiator; a bypass cooling water control valve configured to control an amount of cooling water flowing through the bypass cooling water passage; and a controller configured to control the radiator side cooling water pump and the bypass cooling water control valve to thereby selectively perform one of a stack flow through mode where cooling water flows through at least the stack side cooling water passage and a stack bypass mode where cooling water does not substantially flow through the stack side cooling water passage but flows through the bypass cooling water passage.

According to another aspect of the present invention, there is provided a control method of a fuel cell system, the fuel cell system comprising: a fuel cell stack configured to generate electric power by an electrochemical reaction of a fuel gas and an oxidant gas; a radiator configured to lower a temperature of cooling water for the fuel cell stack; a cooling water feed passage connecting an outlet of a radiator inside cooling water passage in the radiator and an inlet of a stack inside cooling water passage in the fuel cell stack together and a cooling water discharge passage connecting an outlet of the stack inside cooling water passage and an inlet of the radiator inside cooling water passage together, the cooling water feed passage comprising a feed side branching point, a radiator outflow passage from the outlet of the radiator inside cooling water passage to the feed side branching point and a stack inflow passage from the feed side branching point to the inlet of the stack inside cooling water passage, the cooling water discharge passage comprising a discharge side branching point, a stack outflow passage from the outlet of the stack inside cooling water passage to the discharge side branching point, and a radiator inflow passage from the discharge side branching point to the inlet of the radiator inside cooling water passage, the stack inflow passage, the stack inside cooling water passage, and the stack outflow passage forming a stack side cooling water passage, and the radiator inflow passage, the radiator inside cooling water passage, and the radiator outflow passage forming a radiator side cooling water passage; a bypass cooling water passage connecting the feed side branching point and the discharge side branching point together, the bypass cooling water passage comprising a deionizer configured to remove ions in the cooling water; a radiator side cooling water pump arranged in the radiator inflow passage so that an outlet thereof faces the radiator or arranged in the radiator outflow passage so that an inlet thereof faces the radiator; a bypass cooling water control valve configured to control an amount of cooling water flowing through the bypass cooling water passage; and a controller configured to control the radiator side cooling water pump and the bypass cooling water control valve, the control method configured to comprise controlling the radiator side cooling water pump and the bypass cooling water control valve by the controller to thereby selectively perform one of a stack flow through mode where cooling water flow through at least the stack side cooling water passage and a stack bypass mode where cooling water does not substantially flow through the stack side cooling water passage but flows through the bypass cooling water passage.

Advantageous Effects of Invention

Cooling water with a high electrical conductivity can be restricted from flowing into a fuel cell stack.

DESCRIPTION OF EMBODIMENTS

Figure 1:
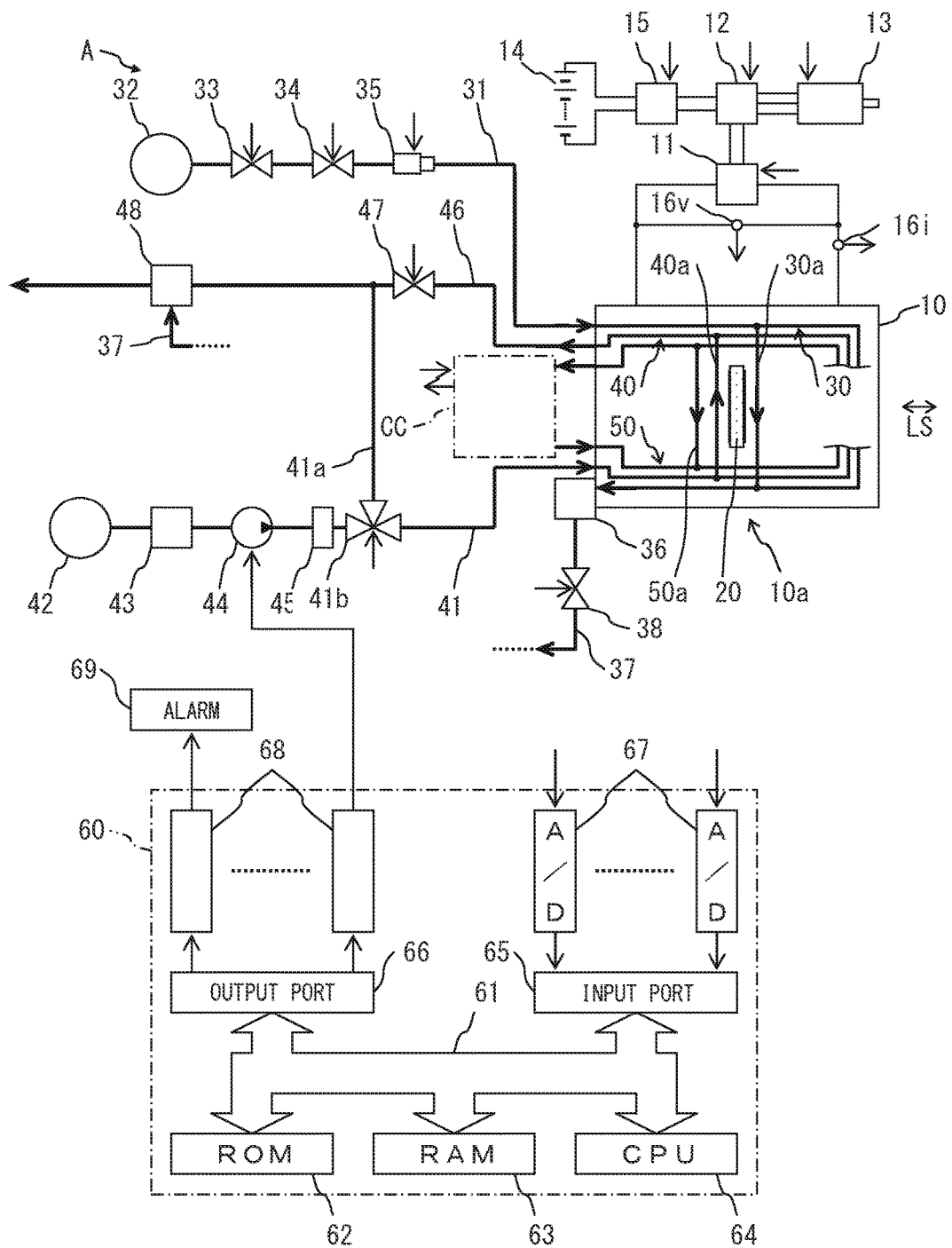
FIG. 1 is an overall view of a fuel cell system.

Referring to FIG. 1, a fuel cell system A is provided with a fuel cell stack 10. The fuel cell stack 10 is provided with a plurality of unit fuel cells 10a stacked together along a stacking direction LS. Each of the unit fuel cells 10a includes a membrane electrode assembly 20. The membrane electrode assembly 20 is provided with a membrane-shaped electrolyte, an anode formed on one side of the electrolyte, and a cathode formed on the other side of the electrolyte.

The anodes and cathodes of the unit fuel cells 10a are respectively electrically connected in series. The outermost side anode and cathode in the stacking direction LS form electrodes of the fuel cell stack 10. The electrodes of the fuel cell stack 10 are electrically connected through a DC/DC converter 11 to an inverter 12, while the inverter 12 is electrically connected to a motor-generator 13. Further, the fuel cell system A is provided with an accumulator 14. This accumulator 14 is electrically connected through a DC/DC converter 15 to the above-mentioned inverter 12. The DC/DC converter 11 is for increasing voltage from the fuel cell stack 10 and sending it to the inverter 12, while the inverter 12 is for converting the DC current from the DC/DC converter 11 or accumulator 14 to AC current. The DC/DC converter 15 is for lowering voltage from the fuel cell stack 10 or motor-generator 13 to the accumulator 14 or increasing voltage from the accumulator 14 to the motor-generator 13. Note that, in the fuel cell system A shown in FIG. 1, the accumulator 14 is comprised of a battery.

Further, inside of each of the unit fuel cells 10a, a hydrogen gas flow path 30a for feeding the anode with fuel gas comprised of hydrogen gas and an air flow path 40a for feeding the cathode with an oxidant gas comprised of air are formed. Between each two adjoining unit fuel cells 10a, a cooling water flow path 50a for feeding the unit fuel cells 10a with cooling water is formed. By connecting the hydrogen gas flow paths 30a, air flow paths 40a, and cooling water flow paths 50a of the plurality of unit fuel cells 10a in parallel, a hydrogen gas passage 30, air passage 40, and cooling water passage 50 are formed in the fuel cell stack 10. In the fuel cell system A shown in FIG. 1, inlets and outlets of the hydrogen gas passage 30, air passage 40, and cooling water passage 50 are respectively arranged at one end of the fuel cell stack 10 in the stacking direction LS.

Referring to a center axis of the fuel cell stack 10 extending in the stacking direction LS as a "stack center axis", in the fuel cell system A shown in FIG. 1, the inlet of the hydrogen gas flow path 30a and the outlet of the air flow path 40a are arranged at one side of the stack center axis while the outlet of the hydrogen gas flow path 30a and inlet of the air flow path 40a are arranged at the other side of the stack center axis. Therefore, the direction of the hydrogen gas flowing through the hydrogen gas flow path 30a and the direction of the air flowing through the air flow path 40a are opposite to each other. That is, the fuel cell stack 10 is configured by a counterflow type of fuel cell stack. In another embodiment (not shown), the inlet of the hydrogen gas flow path 30a and the inlet of the air flow path 40a are arranged at one side of the stack center axis while the outlet of the hydrogen gas flow path 30a and outlet of the air flow path 40a are arranged at the other side of the stack center axis. Therefore, the direction of the hydrogen gas flowing through the hydrogen gas flow path 30a and the direction of the air flowing through the air flow path 40a are substantially the same as each other. That is, in the other embodiment (not shown), the fuel cell stack 10 is configured by a parallel flow type of fuel cell stack.

A hydrogen gas feed path 31 is connected to the inlet of the hydrogen gas passage 30. The hydrogen gas feed path 31 is connected to a hydrogen gas source, for example, a hydrogen tank 32. Inside the hydrogen gas feed path 31, in order from the upstream side, an electromagnetic type cutoff valve 33, a regulator 34 regulating a pressure of the hydrogen gas feed path 31, and a hydrogen gas feeder 35 feeding hydrogen gas from the hydrogen gas source 32 to the fuel cell stack 10 are arranged. In the fuel cell system A shown in FIG. 1, the hydrogen gas feeder 35 is comprised of an electromagnetic type hydrogen gas feed valve. This hydrogen gas feed valve is provided with a needle valve. Therefore, hydrogen gas is intermittently fed from the hydrogen gas feed valve. On the other hand, a purge pipe 37 is connected through a buffer tank 36 to the outlet of the hydrogen gas passage 30. Inside the purge pipe 37, an electromagnetic type purge control valve 38 is arranged. If the cutoff valve 33 and hydrogen gas feed valve 35 are opened, the hydrogen gas in the hydrogen tank 32 is fed through the hydrogen gas feed path 31 to the hydrogen gas passage 30 in the fuel cell stack 10. At this time, a gas flowing out from the hydrogen gas passage 30, that is, an anode off-gas, flows into the buffer tank 36 and is accumulated in the buffer tank 36. The purge control valve 38 is usually closed but is periodically opened for short periods of time. If the purge control valve 38 is opened, the anode off-gas in the buffer tank 36 is discharged through the purge pipe 37 into the atmosphere. That is, purge processing is performed.

In the fuel cell system A shown in FIG. 1, an outlet of the purge pipe 37 is communicated with the atmosphere. That is, the outlet of the hydrogen gas passage 30 is not communicated with the hydrogen gas feed path 31 and therefore is separated from the hydrogen gas feed path 31. This means that the anode off-gas flowing out from the outlet of the hydrogen gas passage 30 is not returned to the hydrogen gas feed path 31. In other words, the fuel cell system A shown in FIG. 1 is a non-hydrogen gas recirculation type in another embodiment (not shown), the outlet of the hydrogen gas passage 30 is connected through a hydrogen gas return pipe to the hydrogen gas feed pipe 31 between the regulator 34 and hydrogen gas feed valve 35, for example. In the hydrogen gas return pipe, in order from the upstream side, a gas-liquid separator and a hydrogen gas return pump sending hydrogen gas separated by the gas-liquid separator to the hydrogen gas feed pipe 31 are arranged. In this case, the anode off-gas including the hydrogen gas is returned through the hydrogen gas return pipe to the hydrogen gas feed pipe 31. As a result, a mixture of hydrogen gas from the hydrogen gas source 32 and hydrogen gas from the hydrogen gas return pipe is fed from the hydrogen gas feed valve 35 to the fuel cell stack 10. In comparison with this other embodiment (not shown), in the fuel cell system A shown in FIG. 1, the hydrogen gas return passage, hydrogen gas return pump, etc. are eliminated. As a result, in the fuel cell system A shown in FIG. 1, the configuration is simplified, the cost is reduced, and space for the hydrogen gas return passage etc. is not required.

Further, an air feed pipe 41 is connected to the inlet of the air passage 40. The air feed pipe 41 is connected to an air source, for example, the atmosphere 42. Inside the air feed pipe 41, in order from the upstream side, an air cleaner 43, a compressor 44 for feeding air under pressure, and an intercooler 45 for cooling air sent from the compressor 44 to the fuel cell stack 10 are arranged. On the other hand, a cathode off-gas pipe 46 is connected to the outlet of the air passage 40. If the compressor 44 is driven, the air is fed through the air feed pipe 41 to the air passage 40 in the fuel cell stack 10. At this time, a gas flowing out from the air passage 40, that is, a cathode off-gas, flows to the cathode off-gas pipe 46. Inside the cathode off-gas pipe 46, in order from the upstream side, an electromagnetic type cathode pressure control valve 47 for controlling a pressure inside the air passage 40, that is, a cathode pressure, and a diluter 48 are arranged. To this diluter 48, the above-mentioned purge pipe 37 is connected. As a result, the hydrogen gas in the purge gas from the purge pipe 37 is diluted by the cathode off-gas. In the fuel cell system A shown in FIG. 1, furthermore, a bypass pipe 41a branching from the air feed pipe 41 downstream of the intercooler 45 to reach the cathode off-gas pipe 46 downstream of the cathode pressure control valve 47 and a bypass control valve 41b controlling an amount of air fed to the fuel cell stack 10 and an amount of air flowing into the bypass pipe 41a in an amount of air discharged from the compressor 44 are provided.

Figure 2:
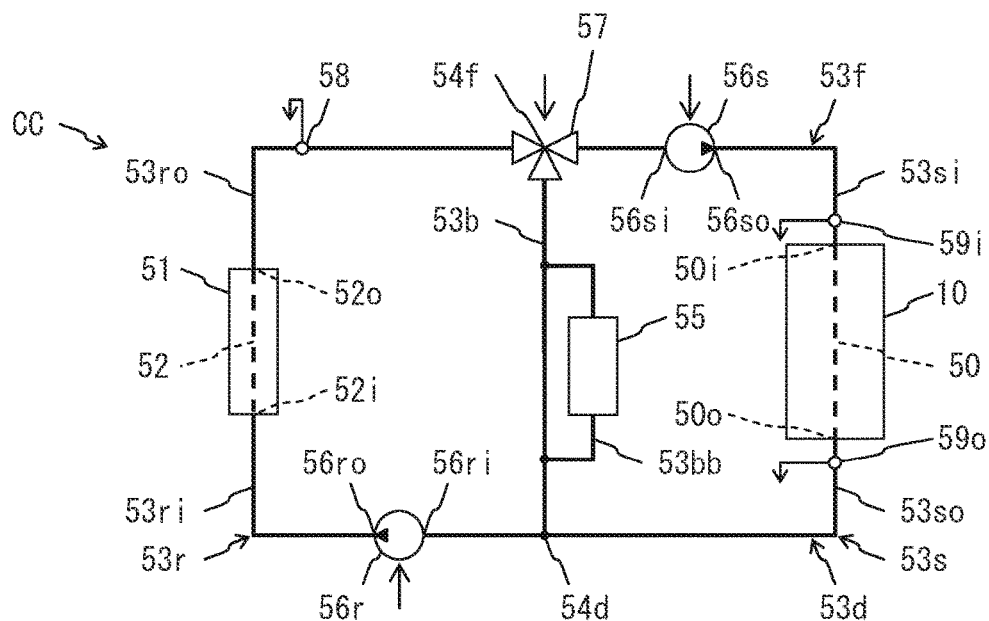
FIG. 2 is a schematic view of a cooling circuit.

A cooling circuit CC is connected to the inlet and outlet of the cooling water passage 50 in the above-mentioned fuel cell stack 10. Referring to FIG. 2, the cooling circuit CC is provided with a radiator 51 configured to lower a temperature of the cooling water. Inside the radiator 51, a radiator inside cooling water passage 52 through which cooling water flows is formed. Referring to the cooling water passage 50 inside the fuel cell stack 10 as a "stack inside cooling water passage", an outlet 52o of the radiator inside cooling water passage 52 and an inlet 50i of the stack inside cooling water passage 50 are connected with each other by a cooling water feed passage 53f. The cooling water feed passage 53f is provided with a radiator outflow passage 53ro from the outlet 52o of the radiator inside cooling water passage 52 to a feed side branching point 54f and a stack inflow passage 53si from the feed side branching point 54f to the inlet 50i of the stack inside cooling water passage 50. Further, an outlet 50o of the stack inside cooling water passage 50 and an inlet 52i of the radiator inside cooling water passage 52 are connected with each other by a cooling water discharge passage 53d. The cooling water discharge passage 53d is provided with a stack outflow passage 53so from the outlet 50o of the stack inside cooling water passage 50 to a discharge side branching point 54d and a radiator inflow passage 53ri from the discharge side branching point 54d to the inlet 52i of the radiator inside cooling water passage 52.

The feed side branching point 54f of the cooling water feed passage 53f and the discharge side branching point 54d of the cooling water discharge passage 53d are connected with each other by a bypass cooling water passage 53b. The bypass cooling water passage 53b is provided with a branch passage 53bb branched from the bypass cooling water passage 53b and returning to the bypass cooling water passage 53b. Inside this branch passage 53bb, a deionizer 55 configured to remove ions in the cooling water is arranged. Therefore, part of the cooling water flowing to the bypass cooling water passage 53b flows through the deionizer 55. The ions in the cooling water flowing through the deionizer 55 are removed. Further, no check valve is provided in the bypass cooling water passage 53b. Therefore, the cooling water can flow between the feed side branching point 54f and the discharge side branching point 54d in both directions. Note that, no cooling water pump is provided in the bypass cooling water passage 53b.

The cooling circuit CC is further provided with two cooling water pumps, that is, a stack side cooling water pump 56s and radiator side cooling water pump 56r. In the embodiment shown in. FIG. 2, the stack side cooling water pump 56s is arranged in the stack inflow passage 53si so that an inlet 56si faces the radiator 51 and an outlet 56so faces the fuel cell stack 10, while the radiator side cooling water pump 56r is arranged in the radiator inflow passage 53ri so that an inlet 56ri faces the fuel cell stack 10 and an outlet 56ro faces the radiator 51. In another embodiment (not shown), the stack side cooling water pump 56s is arranged in the stack outflow passage 53so so that the inlet 56si faces the fuel cell stack 10 and the outlet 56so faces the radiator 51, while the radiator side cooling water pump 56r is arranged in the radiator outflow passage 53ro so that the inlet 56ri faces the radiator 51 and the outlet 56ro faces the fuel cell stack 10. The stack side cooling water pump 56s and radiator side cooling water pump 56r are formed with pumps which can be controlled in amounts of discharge.

The cooling circuit CC is further provided with a bypass cooling water control valve 57 configured to control an amount of cooling water flowing from the radiator outflow passage 53ro into the bypass cooling water passage 53b or an amount of cooling water flowing from the stack outflow passage 53so into the bypass cooling water passage 53b. That is, considering that cooling water passages positioned at the fuel cell stack 10 side with respect to the bypass cooling water passage 53b, that is, the stack inflow passage 53si, stack inside cooling water passage 50, and stack outflow passage 53so, form a stack side cooling water passage 53s and, and that cooling water passages positioned at the radiator 51 side with respect to the bypass cooling water passage 53b, that is, the radiator inflow passage 53ri, radiator inside cooling water passage 52, and radiator outflow passage 53ro, form a radiator side cooling water passage 53r, the bypass cooling water control valve 57 is configured to control an amount of cooling water flowing through the bypass cooling water passage 53b to thereby control an amount of cooling water flowing through the stack side cooling water passage 53s and an amount of cooling water flowing through the radiator side cooling water passage 53r. In the embodiment shown in FIG. 2, the bypass cooling water control valve 57 is formed from an electromagnetic type of three-way valve. Further, in the embodiment shown in FIG. 2, the bypass cooling water control valve 57 is formed from a single flow control valve arranged at the feed side branching point 54f. In another embodiment (not shown), the bypass cooling water control valve 57 is formed from a flow control valve arranged inside the stack side cooling water passage 53s and controlling a flow rate of cooling water flowing through the stack side cooling water passage 53s, and, at least one of a flow control valve arranged inside the radiator side cooling water passage 53r and controlling a flow rate of cooling water flowing through the radiator side cooling water passage 53r, and a flow control valve arranged inside the bypass cooling water passage 53b and controlling a flow rate of cooling water flowing through the bypass cooling water passage 53b.

Therefore, in the embodiment shown in FIG. 2, the only cooling water passage bypassing the fuel cell stack 10 and radiator 51 and connecting the cooling water feed passage 53f and the cooling water discharge passage 53d together is the bypass cooling water passage 53b. As a result, the configuration of the cooling circuit CC can be simplified. On the other hand, in the embodiment shown in FIG. 2, cooling water pumps for circulating the cooling water are the stack side cooling water pump 56s and the radiator side cooling water pump 56r. As a result, the cooling water pumps 56s, 56r can be made smaller in size.

An electrical conductivity sensor 58 configured to detect an electrical conductivity of the cooling water in the radiator outflow passage 53ro is arranged in the radiator outflow passage 53ro. Further, a temperature sensor 59i configured to detect a temperature of the cooling water inside the stack inflow passage 53s is arranged in the stack inflow passage 53si, while a temperature sensor 59o configured to detect a temperature of the cooling water inside the stack outflow passage 53so is arranged in the stack outflow passage 53so. The temperature of the cooling water inside the stack outflow passage 53so expresses a temperature of the fuel cell stack 10, that is, a stack temperature.

In the embodiment shown in FIG. 1 and FIG. 2, if a signal for starting the power generation at the fuel cell stack 10 is issued, at least one of the stack side cooling water pump 56s and radiator side cooling water pump 56r is operated. Due to this, the cooling water flows through the stack inside cooling water passage 50 of the fuel cell stack 10 and therefore the fuel cell stack 10 is cooled. The signal for starting the power generation at the fuel cell stack 10 is, for example, issued by an operator of the electric vehicle operating a start switch (not shown).

Referring again to FIG. 1, an electronic control unit 60 is comprised of a digital computer which is provided with components connected with each other by a bidirectional bus 61 such as a ROM (read only memory) 62, RAM (random access memory) 63, CPU (microprocessor) 64, input port 65, and output port 66. A voltmeter 16v and ammeter 16i for detecting an output voltage and output current of the fuel cell stack 10 are provided at the fuel cell stack 10. Output signals of the voltmeter 16v, ammeter 16i, electrical conductivity sensor 58 (FIG. 2), and temperature sensors 59i, 59o (FIG. 2) are respectively input through corresponding AD converters 67 to the input port 65. On the other hand, the output port 66 is electrically connected through corresponding drive circuits 68 to the DC/DC converter 11, inverter 12, motor-generator 13, DC/DC converter 15, cutoff valve 33, regulator 34, hydrogen gas feed valve 35, purge control valve 38, bypass control valve 41b, compressor 44, cathode pressure control valve 47, stack side cooling water pump 56s (FIG. 2), radiator side cooling water pump 56r (FIG. 2), bypass cooling water control valve 57 (FIG. 2), and alarm device 69. The alarm device 69 is operated if it is difficult for the electrical conductivity of the cooling water to be lowered.

When the fuel cell stack 10 is to be activated, that is, when the power generation at the fuel cell stack 10 is to be started, the cutoff valve 33 and hydrogen gas feed valve 35 are opened and hydrogen gas is fed to the fuel cell stack 10. Further, the compressor 44 is driven and air is fed to the fuel cell stack 10. As a result, at the fuel cell stack 10, an electrochemical reaction ($H_2 \rightarrow 2H^+ + 2e^-$, $(\frac{1}{2})O_2 + 2H^+ + 2e^- \rightarrow H_2O$) occurs and electrical energy is generated. This generated electrical energy is sent to the motor-generator 13. As a result, the motor-generator 13 operates as an electric motor for driving the vehicle and the vehicle is driven. On the other hand, for example, at the time of braking the vehicle, the motor-generator 13 operates as a recovery device. The electrical energy recovered at this time is stored in the accumulator 14.

Now then, in the embodiment shown in FIG. 1 and FIG. 2, it is possible to run cooling water by various cooling water control modes. Below, these cooling water control modes will be explained in order.

Figure 3:
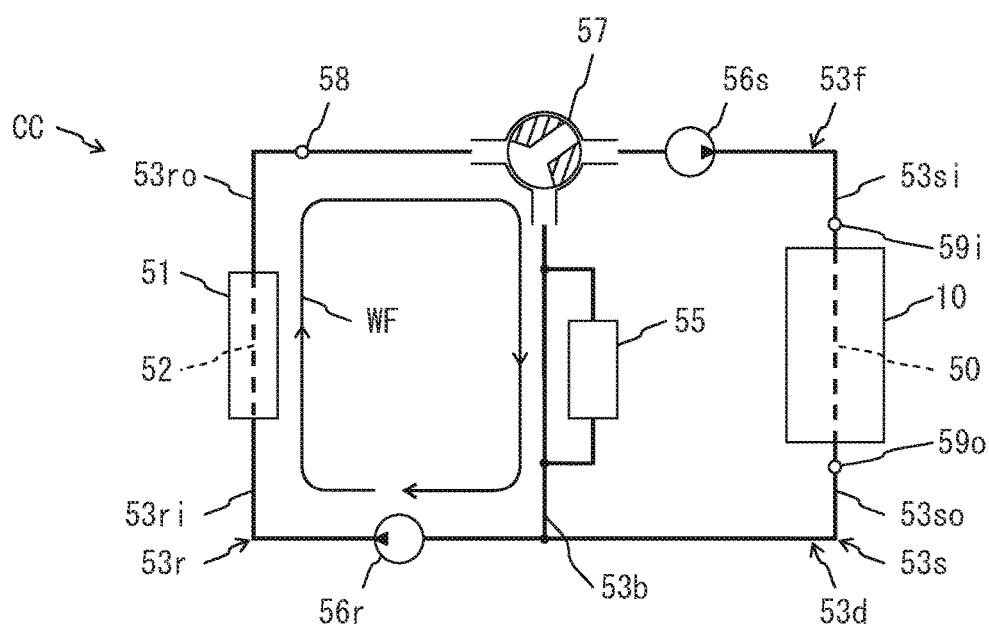
FIG. 3 is a schematic view of a cooling circuit explaining a stack full bypass mode.

In a stack full bypass mode shown in FIG. 3, the radiator side cooling water pump 56r is driven and the stack side cooling water pump 56s is stopped. Further, the bypass cooling water control valve 57 is controlled so that substantially all of the cooling water flowing through the radiator outflow passage 53ro flows into the bypass cooling water passage 53b. That is, due to the bypass cooling water control valve 57, the radiator outflow passage 53ro and the bypass cooling water passage 53b are communicated with each other and the stack inflow passage 53si is separated from the radiator outflow passage 53ro and bypass cooling water passage 53b. As a result, as shown by the arrow WF in FIG. 3, cooling water does not substantially flow through the stack side cooling water passage 53s but circulates through the radiator side cooling water passage 53r and the bypass cooling water passage 53b. In this case, an amount of discharge of the radiator side cooling water pump 56r matches with an amount of cooling water flowing through the radiator side cooling water passage 53r. Note that, in the stack full bypass mode, an amount of cooling water flowing through the stack side cooling water passage 53s is preferably zero.

Figure 4:
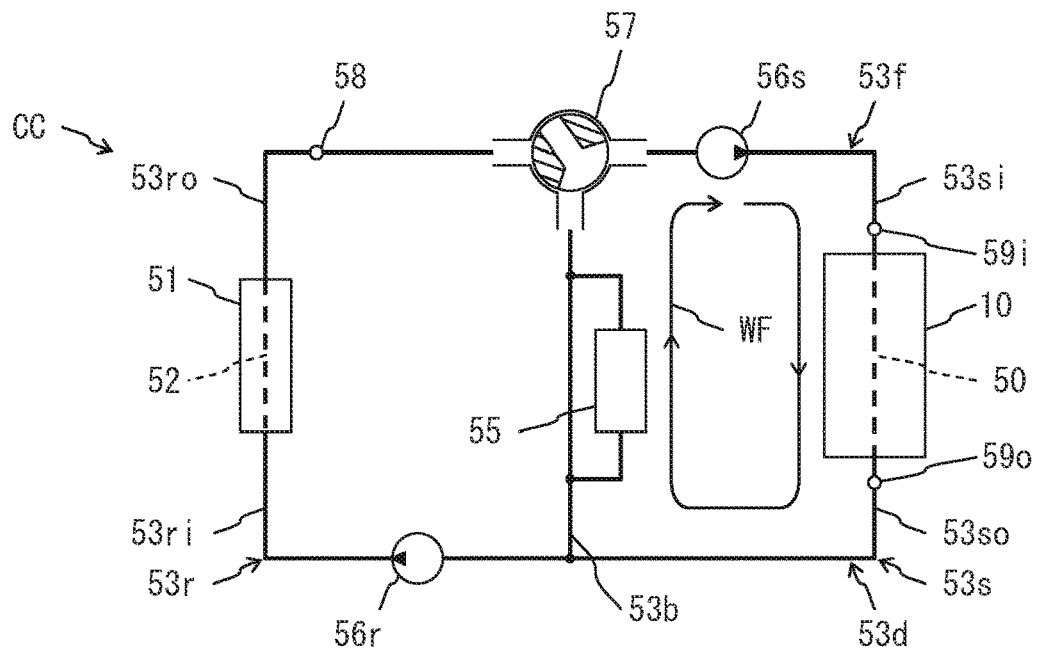
FIG. 4 is a schematic view of a cooling circuit explaining a radiator full bypass mode.

In a radiator full bypass mode shown in FIG. 4, the stack side cooling water pump 56s is driven and the radiator side cooling water pump 56r is stopped. Further, the bypass cooling water control valve 57 is controlled so that substantially all of the amount of cooling water flowing through the stack outflow passage 53ro flows into the bypass cooling water passage 53b. That is, due to the bypass cooling water control valve 57, the stack inflow passage 53si and the bypass cooling water passage 53b are communicated with each other and the radiator outflow passage 53ro is separated from the stack inflow passage 53si and bypass cooling water passage 53b. As a result, as shown by the arrow WF in FIG. 4, cooling water does not substantially flow through the radiator side cooling water passage 53r but circulates through the stack side cooling water passage 53s and the bypass cooling water passage 53b. In this case, an amount of discharge of the stack side cooling water pump 56s matches with an amount of cooling water flowing through the stack side cooling water passage 53s. Note that, in the radiator full bypass mode, an amount of cooling water flowing through the radiator side cooling water passage 53r is preferably zero.

Figure 5:
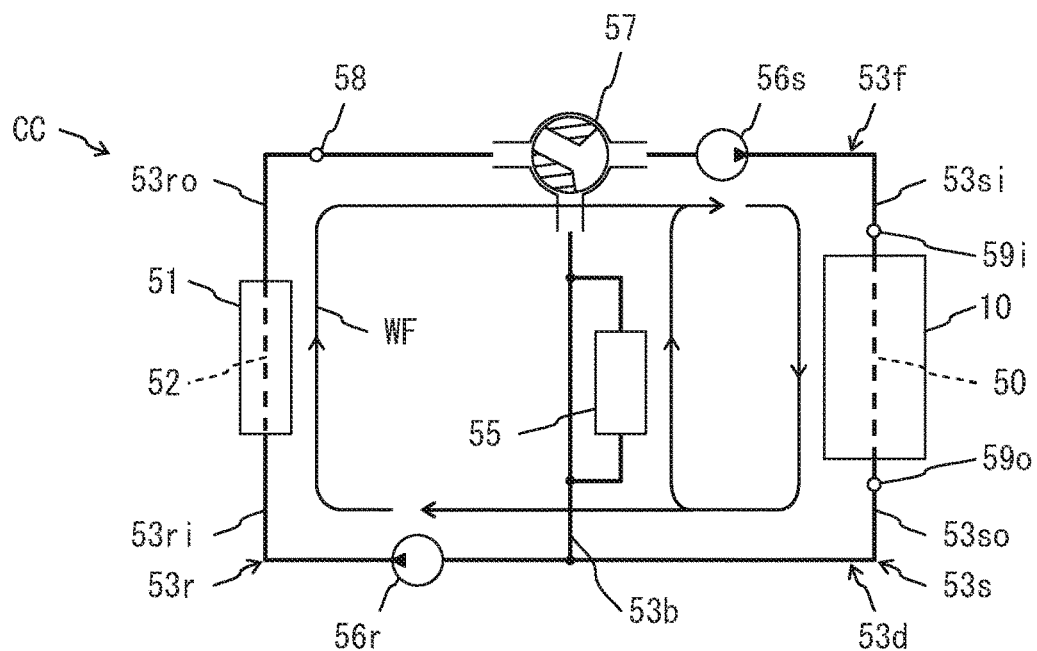
FIG. 5 is a schematic view of a cooling circuit explaining a radiator partial bypass mode.

In a radiator partial bypass mode shown in FIG. 5, the stack side cooling water pump 56s and radiator side cooling water pump 56r are driven so that an amount of discharge of cooling water of the stack side cooling water pump 56s is greater than an amount of discharge of the cooling water of the radiator side cooling water pump 56r. Further, the bypass cooling water control valve 57 is controlled so that part of the amount of cooling water flowing through the stack outflow passage 53so flows into the bypass cooling water passage 53b and the remainder flows into the radiator inflow passage 53ri. That is, due to the bypass cooling water control valve 57, the radiator outflow passage 53ro, stack inflow passage 53si, and bypass cooling water passage 53b are communicated with each other. As a result, as shown by the arrow WF in FIG. 5, the cooling water flows through the stack side cooling water passage 53s, the radiator side cooling water passage 53r, and the bypass cooling water passage 53b. In this case, an amount of cooling water flowing through the stack side cooling water passage 53s is a total of an amount of cooling water flowing through the radiator side cooling water passage 53r and an amount of cooling water flowing through the bypass cooling water passage 53b. Therefore, an amount of cooling water flowing through the radiator side cooling water passage 53r is smaller than an amount of cooling water flowing through the stack side cooling water passage 53s. Further, an amount of discharge of the stack side cooling water pump 56s matches an amount of cooling water flowing through the stack side cooling water passage 53s while an amount of discharge of the radiator side cooling water pump 56r matches an amount of cooling water flowing through the radiator side cooling water passage 53r. Furthermore, if, by controlling a valve position of the bypass cooling water control valve 57, a ratio of an amount of cooling water flowing into the bypass cooling water passage 53b with respect to an amount of cooling water flowing through the stack outflow passage 53so is increased, a ratio of an amount of cooling water flowing into the radiator inflow passage 53ri with respect to an amount of cooling water flowing through the stack outflow passage 53so is decreased.

Figure 6:
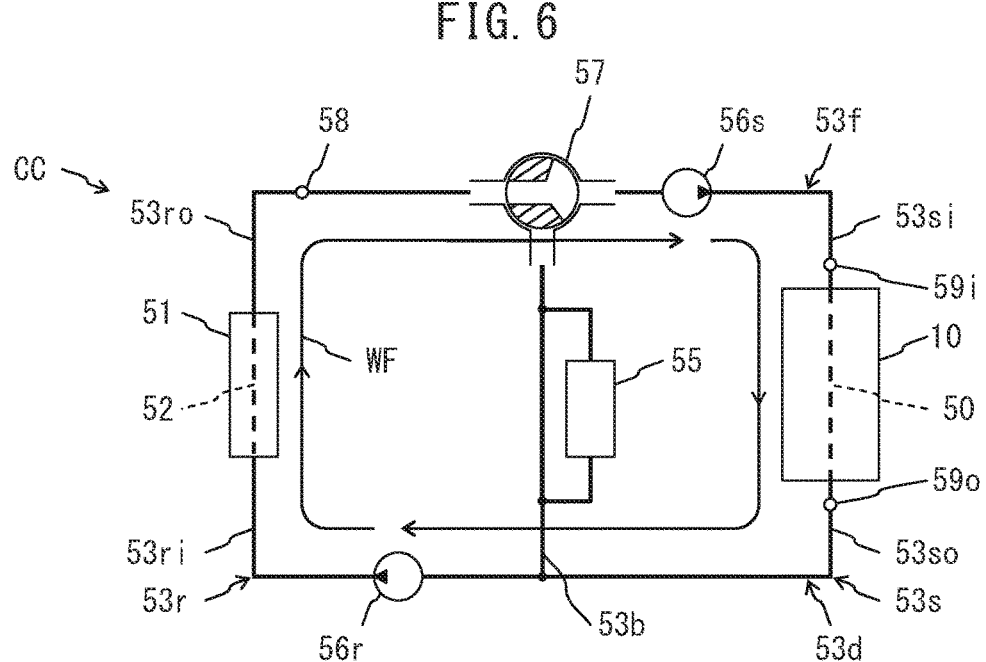
FIG. 6 is a schematic view of a cooling circuit explaining a bypass-less mode.

In a bypass-less mode shown in FIG. 6, the stack side cooling water pump 56s and radiator side cooling water pump 56r are driven so that an amount of discharge of cooling water of the stack side cooling water pump 56s and an amount of discharge of cooling water of the radiator side cooling water pump 56r are substantially the same equal. Further, the bypass cooling water control valve 57 is driven so that cooling water does not substantially flow into the bypass cooling water passage 53b. That is, due to the bypass cooling water control valve 57, the radiator outflow passage 53ro and the stack inflow passage 53si are communicated with each other while the bypass cooling water passage 53b are separated from the radiator outflow passage 53ro and stack inflow passage 53si. As a result, as shown by the arrow WF in FIG. 6, cooling water does not substantially flow through the bypass cooling water passage 53b hut circulates through the radiator side cooling water passage 53r and the stack side cooling water passage 53s. In this case, amounts of cooling water flowing through the radiator side cooling water passage 53r and the stack side cooling water passage 53s are substantially equal to each other. Further, an amount of discharge of the stack side cooling water pump 56s and an amount of discharge of the radiator side cooling water pump 56r match an amount of cooling water flowing through the stack side cooling water passage 53s and an amount of cooling water flowing through the radiator side cooling water passage 53r. Note that, in the bypass-less mode, an amount of cooling water flowing through the bypass cooling water passage 53b is preferably zero.

Figure 7:
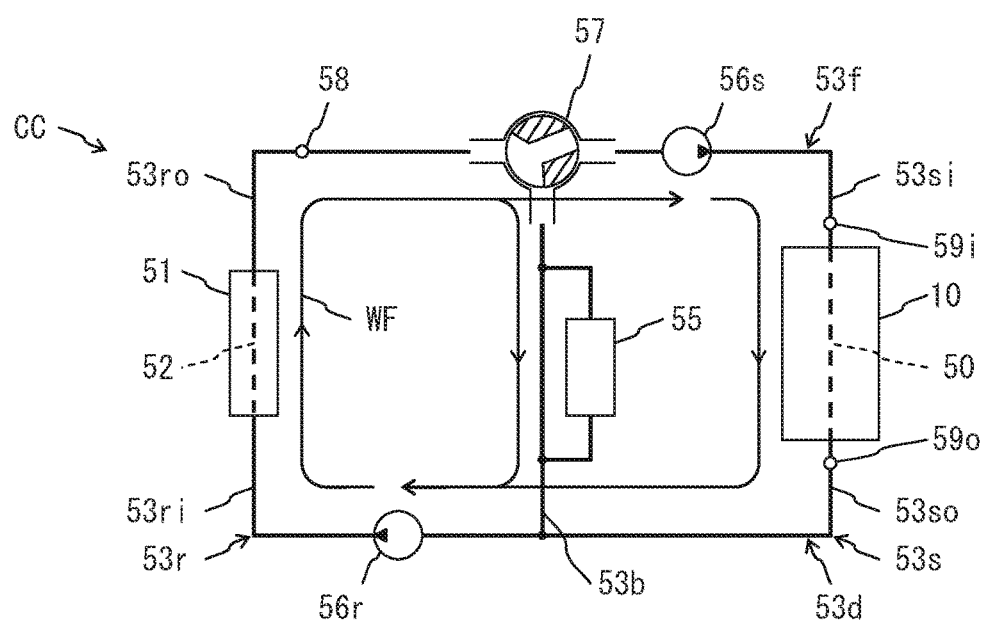
FIG. 7 is a schematic view of a cooling circuit explaining a stack partial bypass mode.

In a stack partial bypass mode shown in FIG. 7, the stack side cooling water pump 56s and radiator side cooling water pump 56r are driven so that an amount of discharge of the cooling water of the radiator side cooling water pump 56r is larger than an amount of discharge of the cooling water of the stack side cooling water pump 56s. Further, the bypass cooling water control valve 57 is controlled so that part of the cooling water flowing through the radiator outflow passage 53ro flows into the bypass cooling water passage 53b and the remainder flows into the stack inflow passage 53si. That is, due to the bypass cooling water control valve 57, the radiator outflow passage 53ro, stack inflow passage 53si, and bypass cooling water passage 53b are communicated with each other. As a result, as shown by the arrow WF in FIG. 7, the cooling water flows through the stack side cooling water passage 53s, the radiator side cooling water passage 53r, and the bypass cooling water passage 53b. In this case, an amount of cooling water flowing through the radiator side cooling water passage 53r is a total of an amount of cooling water flowing through the stack side cooling water passage 53s and an amount of cooling water flowing through the bypass cooling water passage 53b, therefore, an amount of cooling water flowing through the stack side cooling water passage 53s is smaller than an amount of cooling water flowing through the radiator side cooling water passage 53r. Further, an amount of discharge of the stack side cooling water pump 56s matches an amount of cooling water flowing through the stack side cooling water passage 53s, while an amount of discharge of the radiator side cooling water pump 56r matches an amount of cooling water flowing through the radiator side cooling water passage 53r. Furthermore, if a ratio of an amount of cooling water flowing into the bypass cooling water passage 53b with respect to an amount of cooling water flowing through the radiator outflow passage 53ro is increased by controlling a valve position of the bypass cooling water control valve 57, a ratio of an amount of cooling water flowing into the stack inflow passage 53si with respect to an amount of cooling water flowing through the radiator outflow passage 53ro is decreased.

Note that, in the radiator partial bypass mode shown in FIG. 5, if a valve position of the bypass cooling water control valve 57 is controlled so that an amount of cooling water flowing through the bypass cooling water passage 53b is reduced to substantially zero, the cooling water control mode is switched to the bypass-less mode shown in FIG. 6. As opposed to this, if a valve position of the bypass cooling water control valve 57 is controlled so that an amount of cooling water flowing through the bypass cooling water passage 53r is reduced to substantially zero, the cooling water control mode is switched to the radiator full bypass mode shown in FIG. 4.

On the other hand, in the stack partial bypass mode shown in FIG. 7, if a valve position of the bypass cooling water control valve 57 is controlled so that an amount of cooling water flowing through the bypass cooling water passage 53b is reduced to substantially zero, the cooling water control mode is switched to the bypass-less mode shown in FIG. 6. Further, if a valve position of the bypass cooling water control valve 57 is controlled so that an amount of cooling water flowing through the stack side cooling water passage 53s is reduced to substantially zero, the cooling water control mode is switched to the stack full bypass mode shown in FIG. 3.

Note that, referring to a cooling water control mode where the cooling water flows through at least the stack side cooling water passage 53s as a "stack flow through mode", in the embodiment shown in FIG. 1 and FIG. 2, the stack flow through mode includes the above-mentioned radiator full bypass mode (FIG. 4), radiator partial bypass mode (FIG. 5), bypass-less mode (FIG. 6), and stack partial bypass mode (FIG. 7). In another embodiment (not shown), the stack flow through mode includes any one, any two, or any three of the radiator full bypass mode, radiator partial bypass mode, bypass-less mode, and stack partial bypass mode. Therefore, if describing together the embodiment shown in FIG. 1 and FIG. 2 and this other embodiment (not shown), the stack flow through modes include at least one of a radiator full bypass mode, radiator partial bypass mode, bypass-less mode, and stack partial bypass mode.

On the other hand, referring to a cooling water control mode where cooling water does not substantially flow through the stack side cooling water passage 53s but circulates through the bypass cooling water passage 53b as a "stack bypass mode", in the embodiment shown in FIG. 1 and FIG. 2, the stack bypass mode includes the above-mentioned stack full bypass mode (FIG. 3).

Now then, in the embodiment shown in FIG. 1 and FIG. 2, start control is performed at the start of power generation of the fuel cell stack 10. That is, first, the electrical conductivity sensor 56 is used to detect the electrical conductivity of the cooling water. If the electrical conductivity EC of the cooling water is higher than a predetermined first set electrical conductivity EC1, first, the stack bypass mode is performed, then the cooling water control mode is switched to the stack flow through mode. As opposed to this, if the electrical conductivity EC of the cooling water is lower than the first set electrical conductivity EC1, the stack flow through mode is performed without performing the stack bypass mode. This start control will be further explained with reference to FIG. 8 and FIG. 9.

Figure 8:
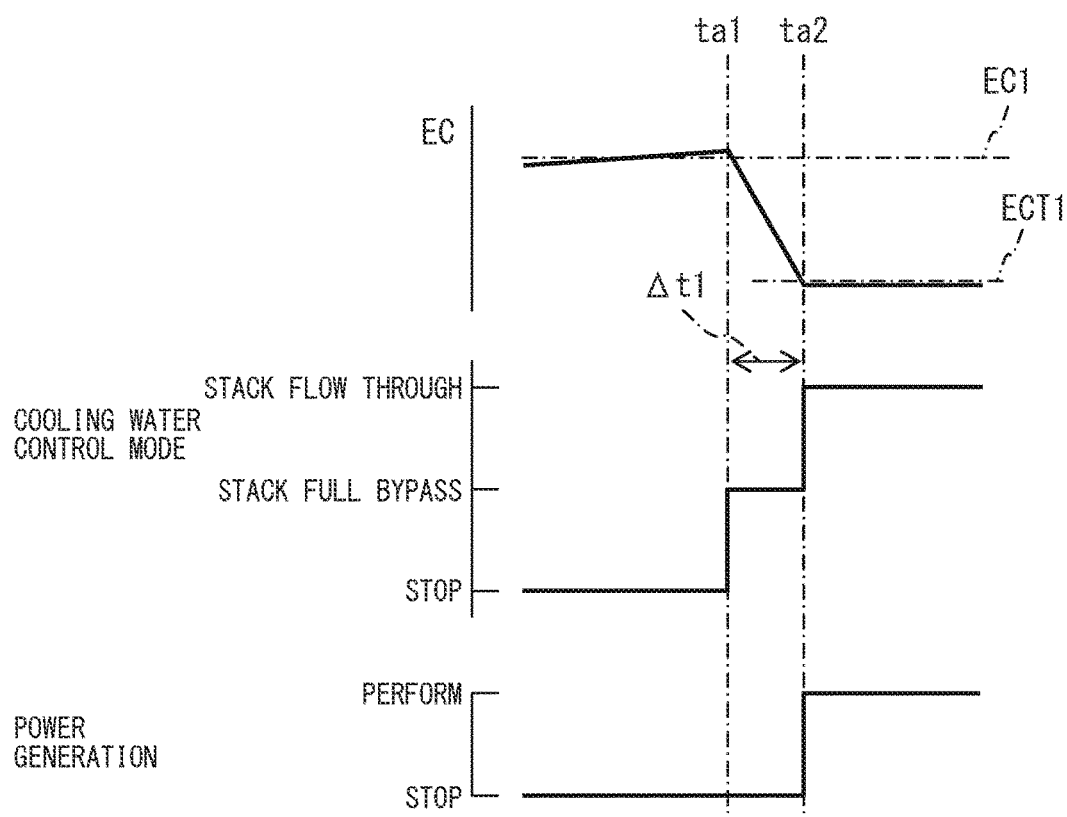
FIG. 8 is a time chart explaining start control.

In FIG. 8, the time ta1 shows a time when a signal for starting power generation at the fuel cell stack 10 is issued. In the example shown in FIG. 8, the electrical conductivity EC of the cooling water at the time ta1 is higher than the first set electrical conductivity EC1. Therefore, first, the stack bypass mode, that is, the stack full bypass mode in the embodiment shown in FIG. 1 and FIG. 2, is performed. As a result, cooling water with a high electrical conductivity is restricted from flowing into the fuel cell stack 10. Further, cooling water is guided into the deionizer 55, therefore the electrical conductivity EC of the cooling water gradually falls. In the example shown in FIG. 8, the stack full bypass mode continues over a predetermined first set time $\Delta t1$. That is, at the time $ta2$ after the elapse of the first set time $\Delta t1$ from when the stack full bypass mode is started, the stack full bypass mode is ended and the stack flow through mode is started. As a result, cooling water is introduced into the fuel cell stack 10 and the fuel cell stack 10 starts to be cooled. At this time, the electrical conductivity EC of the cooling water has been lowered, therefore the electrical insulating ability of the fuel cell stack 10 is restricted from lowering. Note that, in this stack full bypass mode, the amount of discharge of the radiator side cooling water pump 56r is set to the maximum amount of the radiator side cooling water pump 56r. This enables the electrical conductivity EC of the cooling water to lower quickly.

When the stack full bypass mode is performed, cooling water does not substantially flow through the fuel cell stack 10. If power is generated at the fuel cell stack 10 in this state, the temperature in the fuel cell stack 10 is liable to excessively increase or to become unpreferably uneven. Therefore, in the example shown in FIG. 8, while the stack full bypass mode is performed, power is not generated at the fuel cell stack 10. When the stack full bypass mode ends, that is, when the stack flow through mode is started, power generation at the fuel cell stack 10 is started. In other words, even if the signal for start of power generation at the fuel cell stack 10 is issued, the power generation at the fuel cell stack 10 is delayed. In the example shown in FIG. 8, the power generation at the fuel cell stack 10 is delayed by the first set time $\Delta t1$. As a result, the temperature of the fuel cell stack 10 is maintained low and even.

Note that, at the time of start of power generation at the fuel cell stack 10 where the stack full bypass mode is performed, the temperature of the fuel cell stack 10 is not necessarily high. Therefore, in another embodiment (not shown), even if the stack full bypass mode is performed, power is generated at the fuel cell stack 10. That is, in this other embodiment, if a signal for starting power generation at the fuel cell stack 10 is issued, the stack full bypass mode is started and power generation at the fuel cell stack 10 is started without delay.

As explained above, in the stack bypass mode, cooling water does not substantially flow through the fuel cell stack 10. That is, cooling water, despite being for cooling the fuel cell stack 10, does not substantially flow through the fuel cell stack 10 but flows at the outside of the fuel cell stack 10 in the stack bypass mode. This enables cooling water to be fed to the deionizer 55 as much as possible to thereby enable the electrical conductivity EC of the cooling water to drop as quickly as possible and, simultaneously, enables cooling water with a high electrical conductivity to restrict from flowing into the fuel cell stack 10. Such an idea has not existed up to now.

Figure 9:
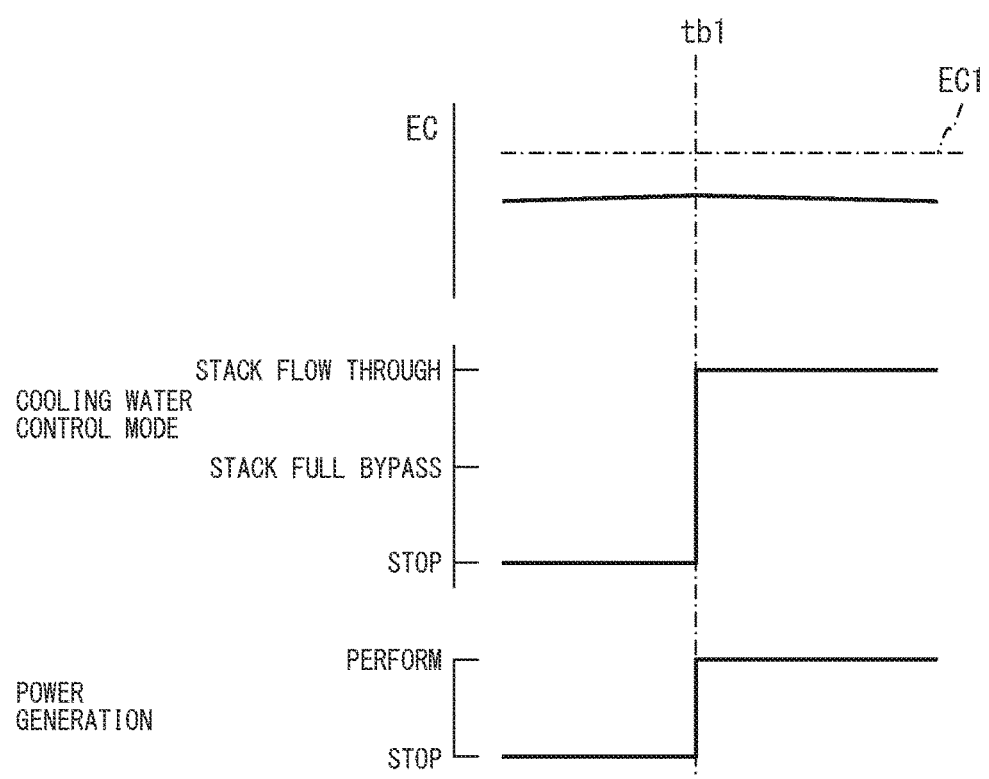
FIG. 9 is a time chart explaining start control.

On the other hand, in FIG. 9, the time $tb1$ shows a time when a signal for start of the power generation at the fuel cell stack 10 is issued. In the example shown in FIG. 9, the electrical conductivity EC of the cooling water at the time $tb1$ is lower than the first set electrical conductivity EC1. Therefore, the stack flow through mode is started without performing the stack bypass mode, that is, the stack full bypass mode in the embodiment shown in FIG. 1 and FIG. 2. As a result, cooling of the fuel cell stack 10 is quickly started.

In the example shown in FIG. 9, the stack bypass mode is not performed, and thus, at the time $tb1$, power generation is started at the fuel cell stack 10. In other words, when a signal for start of power generation at the fuel cell stack 10 is issued, power generation at the fuel cell stack 10 is started without delay.

Furthermore, in the embodiment shown in FIG. 1 and FIG. 2, at the time of start of power generation at the fuel cell stack 10, even if the stack full bypass mode is performed over the first set time $\Delta t1$, if the electrical conductivity EC of the cooling water is higher than a predetermined first threshold electrical conductivity ECT1, the alarm device 69 is operated and the difficulty in lowering the electrical conductivity EC of the cooling water is informed to the vehicle operator. As opposed to this, as shown in FIG. 8, if, as a result of operating in the stack full bypass mode over the first set time $\Delta t1$ at the start of power generation at the fuel cell stack 10, the electrical conductivity EC of the cooling water is lower than the first threshold electrical conductivity ECT1, the alarm device 69 is maintained in a stopped state. In the example shown in FIG. 8, the first threshold electrical conductivity ECT1 is lower than the first set electrical conductivity EC1.

Note that, as explained above, in the example shown in FIG. 8, the stack full bypass mode is continued over the first set time $\Delta t1$. In another embodiment (not shown), the stack full bypass mode is continued until the electrical conductivity CC of the cooling water falls to a constant small value, then the cooling water control mode is switched to the stack flow through mode. This constant small value is lower than the first set electrical conductivity EC1 and, for example, is substantially equal to the first threshold electrical conductivity ECT1.

Now then, in the embodiment shown in FIG. 1 and FIG. 2, as explained above, if a signal for starting power generation at the fuel cell stack 10 is issued, a stack flow through mode is performed after the stack bypass mode is performed or without the stack bypass mode being performed. As explained above, in the embodiment shown in FIG. 1 and FIG. 2, the stack flow through mode includes the radiator full bypass mode (FIG. 4), radiator partial bypass mode (FIG. 5), bypass-less mode (FIG. 6), and stack partial bypass mode (FIG. 7).

Specifically, if the stack temperature TS is lower than a predetermined low temperature side set temperature TSL, the radiator full bypass mode is performed.

As opposed to this, when the stack temperature TS is higher than the low temperature side set temperature TSL, the stack partial bypass mode, radiator partial bypass mode, or bypass-less mode is performed. That is, if the stack temperature TS is higher than the low temperature side set temperature TSL and if the electrical conductivity EC of the cooling water is higher than a predetermined second set electrical conductivity EC2, the stack partial bypass mode is performed. As opposed to this, if the stack temperature TS is higher than the low temperature side set temperature TSL and if the electrical conductivity EC of the cooling water is lower than the second set electrical conductivity EC2 and the stack temperature TS is lower than a predetermined high temperature side set temperature TSH, the radiator partial bypass mode is performed. On the other hand, if the stack temperature TS is higher than the low temperature side set temperature TSL and ifs the electrical conductivity EC of the cooling water is lower than the second set electrical conductivity EC2 and the stack temperature TS is higher than the high temperature side set temperature TSH, the bypass-less mode is performed. The second set electrical conductivity EC2 is for example substantially equal to the above-mentioned the first set electrical conductivity EC1.

Figure 10:
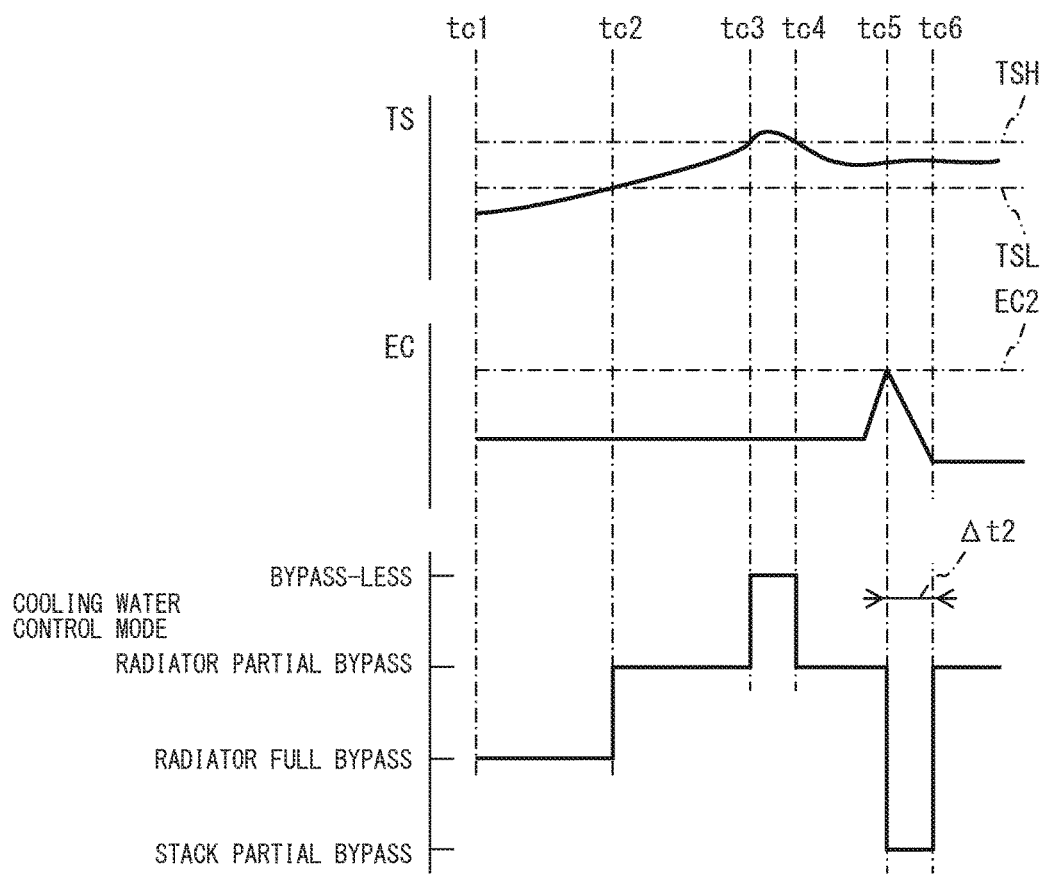
FIG. 10 is a time chart explaining cooling water control after a signal for starting power generation at the fuel cell stack 10 is issued.

That is, in FIG. 10, the time tc1 shows a time for starting the stack flow through mode. In the example shown in FIG. 10, the stack temperature TS at the time tc1 is lower than the low temperature side set temperature TSL, and therefore the radiator full bypass mode is performed. In the radiator full bypass mode, the cooling water does not flow through the radiator 51, and thus the drop in temperature of the cooling water is restricted and therefore the stack temperature TS quickly increases. That is, warmup of the fuel cell stack 10 is promoted. In this case, the amount of discharge of the stack side cooling water pump 56s is set so that, for example, a difference between the temperature of the cooling water in the stack outflow passage 53so and the temperature of the cooling water in the stack inflow passage 53si, that is, a stack temperature difference, is maintained in a target range.

Next, at the time tc2, the stack temperature TS becomes higher than the low temperature side set temperature TSL. In the example shown in FIG. 10, at the time tc2, the electrical conductivity EC of the cooling water is lower than the second set electrical conductivity EC2 while the stack temperature TS is lower than the high temperature side set temperature TSH. Therefore, the radiator partial bypass mode is performed. As a result, part of the cooling water bypasses the radiator 51, and therefore the drop in temperature of the cooling water is restricted. Further, part of the cooling water flows through the deionizer 55 and therefore the electrical conductivity EC of the cooling water is restricted. Note that, at the time of the radiator partial bypass mode, the amounts of discharge of the stack side cooling water pump 56s and radiator side cooling water pump 56r and the valve position of the bypass cooling water control valve 57 are set so that the stack temperature TS and stack temperature difference are maintained respectively in the target ranges.

Next, at the time tc3, if the stack temperature TS becomes higher than the high temperature side set temperature TSH, the cooling water control mode is switched to the bypass-less mode. As a result, the drop in temperature of the cooling water in the radiator 51 is promoted and the stack temperature TS starts to fall. Note that, the amounts of discharge of the stack side cooling water pump 56s and radiator side cooling water pump 56r at the bypass-less mode are set so that the stack temperature TS and stack temperature difference are respectively maintained in their target ranges.

Next, at the time tc4, if the stack temperature TS becomes lower than the high temperature side set temperature TSH, the cooling water control mode is returned to the radiator partial bypass mode.

Next, at the time tc5, if the electrical conductivity EC of the cooling water becomes higher than the second set electrical conductivity EC2 for some reason or another, the cooling water control mode is switched to the stack partial bypass mode. As a result, cooling water with a high electrical conductivity EC is restricted from flowing into the fuel cell stack 10. Further, part of the cooling water flows through the deionizer 55, therefore the electrical conductivity EC of the cooling water is restricted. At the stack partial bypass mode, as explained above, the amount of cooling water sent to the fuel cell stack 10 is smaller than the amount of cooling water sent to the radiator 51. Thus, it may be considered that the cooling of the fuel cell stack 10 is insufficient. However, a large amount of cooling water is sent to the radiator 51, and thus the cooling water is sufficiently lowered in temperature and low temperature cooling water is sent to the fuel cell stack 10. Thus, the fuel cell stack 10 can be sufficiently cooled. Therefore, when the stack partial bypass mode is performed, power generation at the fuel cell stack 10 is possible. Note that, at the time of the stack partial bypass mode, the amounts of discharge of the stack side cooling water pump 56s and radiator side cooling water pump 56r and the valve position of the bypass cooling water control valve 57 are set so that the stack temperature TS and stack temperature difference are maintained in respective target ranges.

In the example shown in FIG. 10, the stack partial bypass mode is performed over a predetermined second set time Δt2. That is, at the time tc6 after the elapse of the second set time Δt2 from when the stack partial bypass mode is started, the stack temperature TS at this time is lower than the high temperature side set temperature TSH, and thus the cooling water control mode is switched from the stack partial bypass mode to the radiator partial bypass mode. In another embodiment (not shown), the stack partial bypass mode is maintained until the electrical conductivity EC of the cooling water fails to a certain small value. This certain small value is lower than the second set electrical conductivity EC2 and, for example, is substantially equal to the first threshold electrical conductivity ECT1.

Note that, while not shown in FIG. 10, in the embodiment shown in FIG. 1 and FIG. 2, when the bypass-less mode is performed, if the electrical conductivity EC of the cooling water becomes higher than the second set electrical conductivity EC2, the cooling water control mode is switched to the stack partial bypass mode. That is, if the electrical conductivity EC of the cooling water is higher than the second set electrical conductivity EC2, the stack partial bypass mode is performed even if the stack temperature TS is higher than the high temperature side set temperature TSH. In another embodiment (not shown), if the stack temperature TS is higher than the high temperature side set temperature TSH, the bypass-less mode is performed even if the electrical conductivity EC of the cooling water is higher than the second set electrical conductivity EC2.

Furthermore, in the embodiment shown in FIG. 1 and FIG. 2, when the stack flow through mode should be performed but the stack partial bypass mode is performed, the alarm device 69 is operated. As opposed to this, when the stack flow through mode should be performed but the radiator full bypass mode or radiator partial bypass mode or bypass-less mode is performed, the alarm device 69 is maintained in the stopped state.

As explained above, if the stack flow through mode is started, power generation at the fuel cell stack 10 is started. Therefore, in the embodiment shown in FIG. 1 and FIG. 2, during power generation at the fuel cell stack 10, the electrical conductivity EC of the cooling water is restricted while the fuel cell stack 10 is cooled.

If power generation at the fuel cell stack 10 is stopped, the stack side cooling water pump 56s and radiator side cooling water pump 56r are stopped.

in the embodiment shown in FIG. 1 and FIG. 2, furthermore, even during the stoppage of power generation at the fuel cell stack 10, the electrical conductivity PC of the cooling water is restricted. That is, during the stoppage of power generation of the fuel cell stack 10, the electrical conductivity EC of the cooling water is detected each time a predetermined third set time Δt3 is elapsed. If the electrical conductivity EC of the cooling water is higher than a predetermined set value ECS, the stack bypass mode, that is, the stack full bypass mode in the embodiment shown in FIG. 1 and FIG. 2, is temporarily performed, to thereby lower the electrical conductivity EC of the cooling water. The set value ECS is, for example, substantially equal to the first set electrical conductivity EC1.

Figure 11:
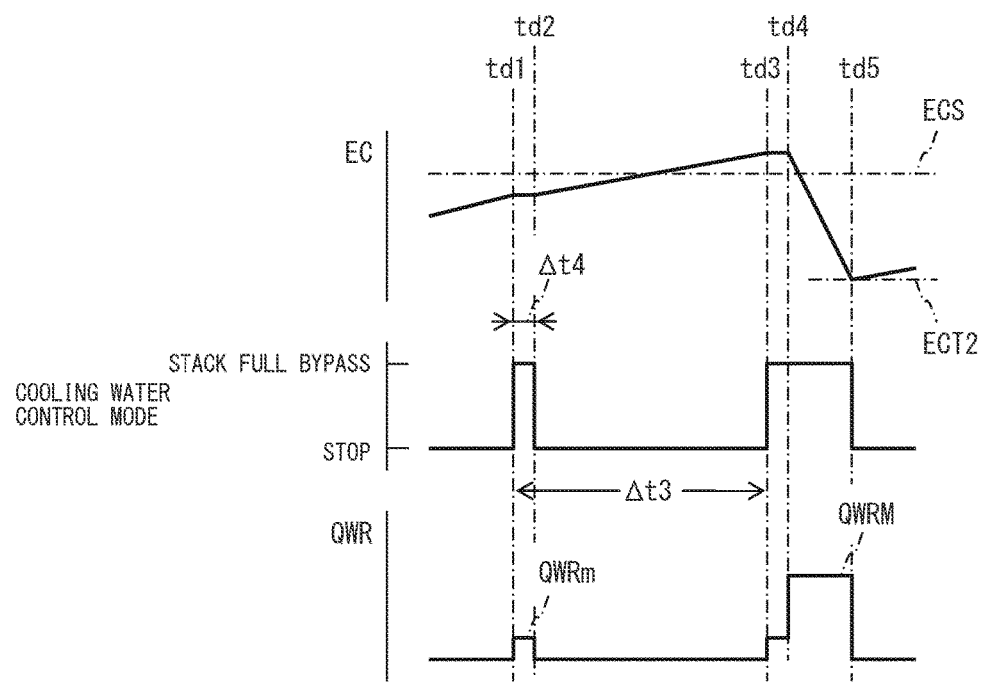
FIG. 11 is a time chart explaining cooling water control during stoppage of power generation at the fuel cell stack 10.

That is, in the example shown in FIG. 11, at the time td1, the stack full bypass mode is performed. In this case, the discharge amount QWR of the radiator side cooling water pump 56r is set to a small constant amount QWRm. As a result, the electrical conductivity EC of the cooling water is evened out. In the example shown in FIG. 11, the stack full bypass mode as performed over a predetermined fourth set time Δt4. Next, at the time td2 after the elapse of the fourth set time Δt4 from when the stack full bypass mode is started, the electrical conductivity PC of the cooling water is detected. The electrical conductivity PC of the cooling water at the time td2 is lower than the set value ECS. Therefore, the stack full bypass mode is stopped.

Next, at the time td3 after the elapse of the third set time Δt3 from the previous stack full bypass mode, the discharge amount QWR of the radiator side cooling water pump 56r is again set to the constant amount QWRm while the stack full bypass mode is performed. Next, at the time td4 after the elapse of the fourth set time Δt4, the electrical conductivity EC of the cooling water is detected. The electrical conductivity EC of the cooling water at the time td4 is higher than the set value ECS. Therefore, the stack full bypass mode is continued. In this case, the discharge amount QWR of the radiator side cooling water pump 56r is increased up to the maximum amount QWRM of the radiator side cooling water pump 56r (>0). As a result, the electrical conductivity EC of the cooling water quickly falls. Next, at the time period td5 where the electrical conductivity EC of the cooling water falls to a predetermined second threshold electrical conductivity ECT2, the stack full bypass mode is stopped. The second threshold electrical conductivity ECT2 is lower than the set value ECS and, for example, is substantially equal to the first threshold electrical conductivity ECT1. In another embodiment (not shown), the stack full bypass mode is maintained over a predetermined time.

In this way, in the embodiment shown in FIG. 1 and FIG. 2, while power generation at the fuel cell stack 10 is stopped, the electrical conductivity EC of the cooling water is restricted. As a result, the time period during which the stack full bypass mode is performed at the start of power generation at the fuel cell stack 10, that is, the first set time Δt1, can be shortened. That is, it is possible to shorten the time period Δt1 (FIG. 8) of the stack full bypass mode required when power generation at the fuel cell stack 10 should be started or possible to omit the stack full bypass mode. Therefore, it is possible to quickly start power generation at the fuel cell stack 10.

Note that, in the example shown in FIG. 11, the electrical conductivity EC of the cooling water is detected after the stack full bypass mode is performed. In another embodiment (not shown), the electrical conductivity EC of the cooling water is detected without performing the stack full bypass mode.

In this way, in the embodiment shown in FIG. 1 and. FIG. 2, the radiator side cooling water pump 56r and stack side cooling water pump 56s and the bypass cooling water control valve 57 are controlled to thereby perform selectively one of the stack bypass mode and the stack flow through mode. In this case, the stack flow through mode includes the radiator full bypass mode, radiator partial bypass mode, bypass-less mode, and stack partial bypass mode. Further, the stack bypass mode includes the stack full bypass mode.

Figure 12:
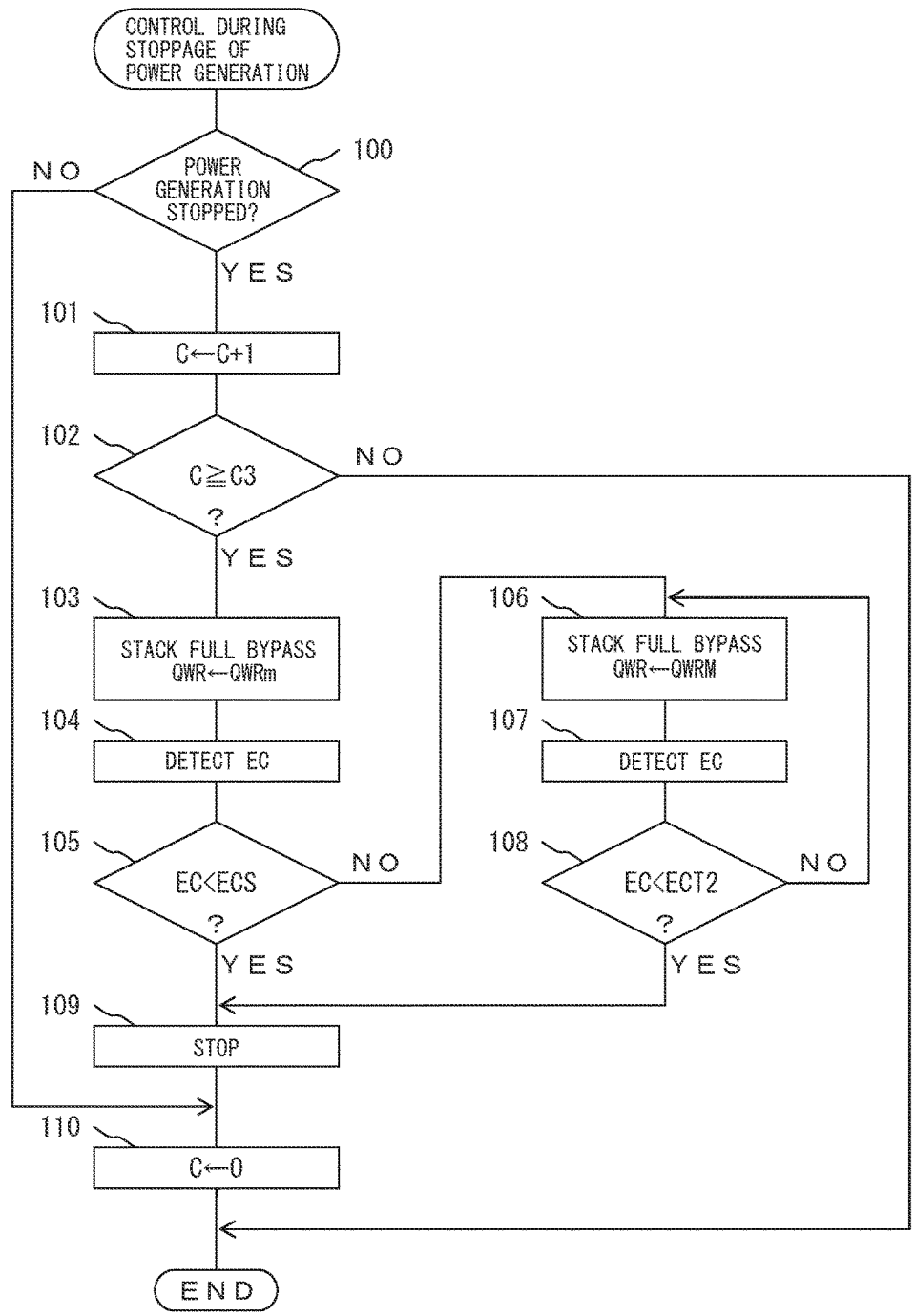
FIG. 12 is a flow chart for performing cooling water control during stoppage of power generation at the fuel cell stack 10.

FIG. 12 shows a routine for performing cooling water control while power generation at the above-mentioned fuel cell stack 10 is stopped. This routine is performed by interruption every predetermined set time interval.

Referring to FIG. 12, at step 100, it is judged if the power generation at the fuel cell stack 10 is stopped. If the power generation at the fuel cell stack 10 is stopped, next, the routine proceeds to step 101 where a counter value C is incremented by 1. This counter value C shows the elapsed time from when power generation at the fuel cell stack 10 is stopped or the elapsed time from when the previous stack bypass mode, that is, the previous stack full bypass mode, is started. At the next step 102, it is judged if the counter value C is equal to or more than a set value C3 corresponding to the above-mentioned third set time Δt3. If C<C3, the processing step is ended. If C≥C3, next, the routine proceeds to step 103 where the discharge amount QWR of the radiator side cooling water pump 56r is set to the constant amount QWRm while the stack bypass mode, that is, the stack full bypass mode, is performed over the fourth set time Δt4. At the next step 104, the electrical conductivity EC of the cooling water is detected. At the next step 105, it is judged if the electrical conductivity EC of the cooling water is lower than the set value ECS. If EC≥ECS, next, the routine proceeds to step 106 where the discharge amount QWR of the radiator side cooling water pump 56r is set to the maximum amount QWRM while the stack full bypass mode is performed. At the next step 107, the electrical conductivity EC of the cooling water is detected. At the next step 108, it is judged if the electrical conductivity EC of the cooling water is lower than the second threshold electrical conductivity ECT2. If EC≥ECT2, the routine returns to step 106. If EC<ECT2, the routine proceeds to step 109. On the other hand, if EC<ECS at step 105, the routine also proceeds to step 109.

At step 109, the stack full bypass mode is stopped. At the next step 110, the counter value C is returned to zero. On the other hand, if power generation at the fuel cell stack 10 is in process at step 100, next, the routine proceeds to step 110.

Figure 13:
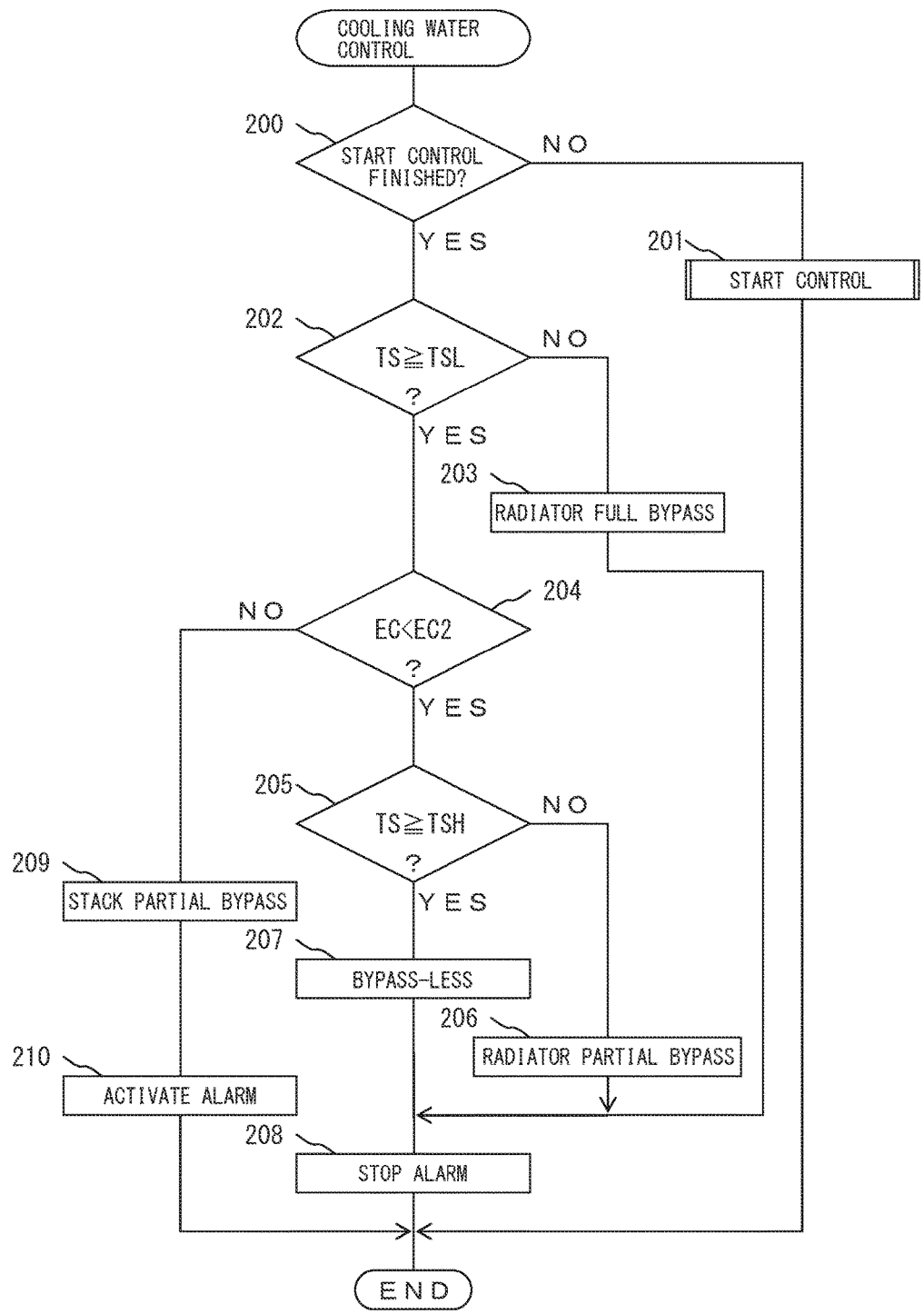
FIG. 13 is a flow chart for performing cooling water control after a signal for starting power generation at the fuel cell stack 10 is issued.

FIG. 13 shows a routine for cooling water control after a signal is issued to start power generation at the fuel cell stack 10. This routine is performed by interruption at predetermined set time intervals.

Referring to FIG. 13, at step 200, it is judged if the above-mentioned start control is completed at the time of start of power generation at the fuel cell stack 10. If the start control has not been completed, next, the routine proceeds to step 201 where a start control routine for performing the start control is executed. This start control routine is shown in FIG. 14.

Figure 14:
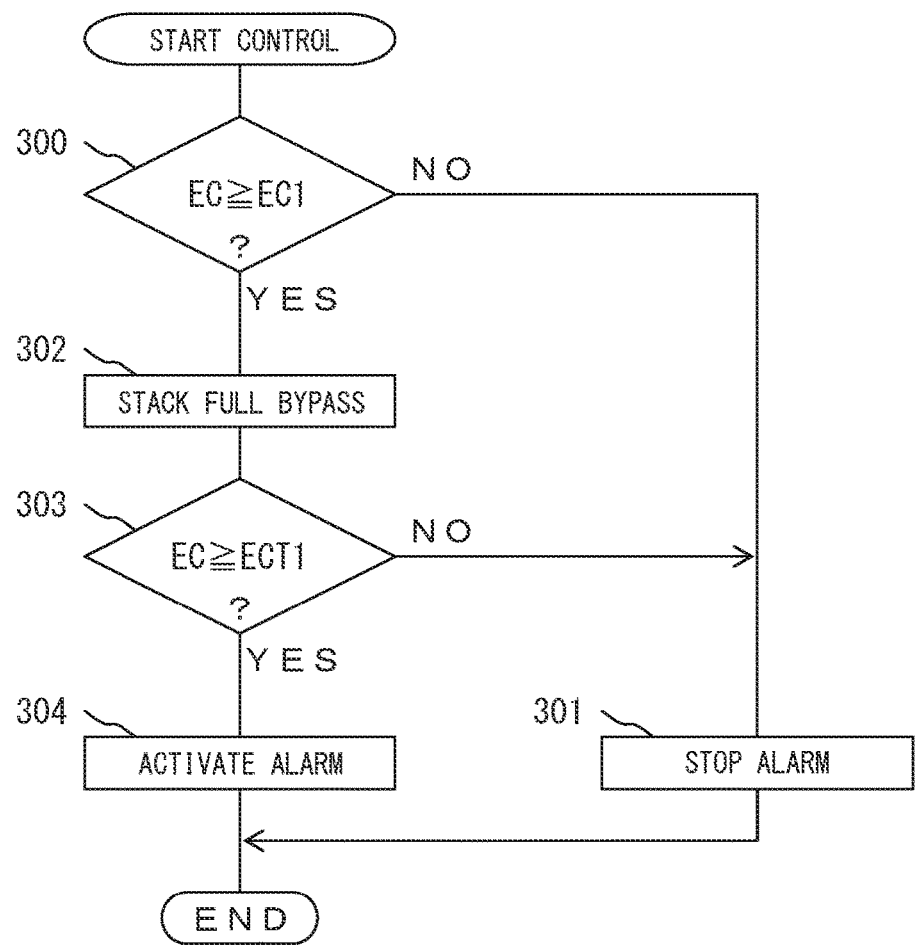
FIG. 14 is a flow chart for performing start control.

Referring to FIG. 14, at step 300, it is judged if the electrical conductivity EC of the cooling water is equal to or higher than the first set electrical conductivity EC1. If EC<EC1, next, the routine proceeds to step 301 where the alarm device 69 is stopped. As opposed to this, if EC≥EC1, the routine proceeds from step 300 to step 302 where the stack bypass mode, that is, the stack full bypass mode, is performed over the first set time Δt1. At the next step 303, it is judged if the electrical conductivity EC of the cooling water is equal to or higher than the first threshold electrical conductivity EC1. If EC<ECT1, next, the routine proceeds to step 301. As opposed to this, if EC≥ECT1, next, the routine proceeds to step 304 where the alarm device 69 is operated.

Referring again to FIG. 13, if the start control routine is completed, the routine proceeds from step 200 to step 202 where it is judged if the stack temperature TS is equal to or higher than the low temperature side set temperature TSL. If TS<TSL, next, the routine proceeds to step 203 where the radiator full bypass mode is performed. Next, the routine proceeds to step 208. As opposed to this, if TS>TSL, the routine proceeds from step 202 to step 204 where it is judged if the electrical conductivity EC of the cooling water is lower than the second set electrical conductivity EC2. If EC<EC2, next, the routine proceeds to step 205 where it is judged if the stack temperature TS is equal to or higher than the high temperature side set temperature TSH. If IS<TSH, next, the routine proceeds to step 206 where the radiator partial bypass mode is performed. Next, the routine proceeds to step 208. As opposed to this, if TS≥TSH, the routine proceeds from step 205 to step 207 where the bypass-less mode is performed. Next, the routine proceeds to step 208. At step 208, the alarm device 69 is stopped.

On the other hand, if EC≥EC2, the routine proceeds from step 204 to step 209 where the stack partial bypass mode is performed. At the next step 210, the alarm device 69 is operated.

Figure 15:
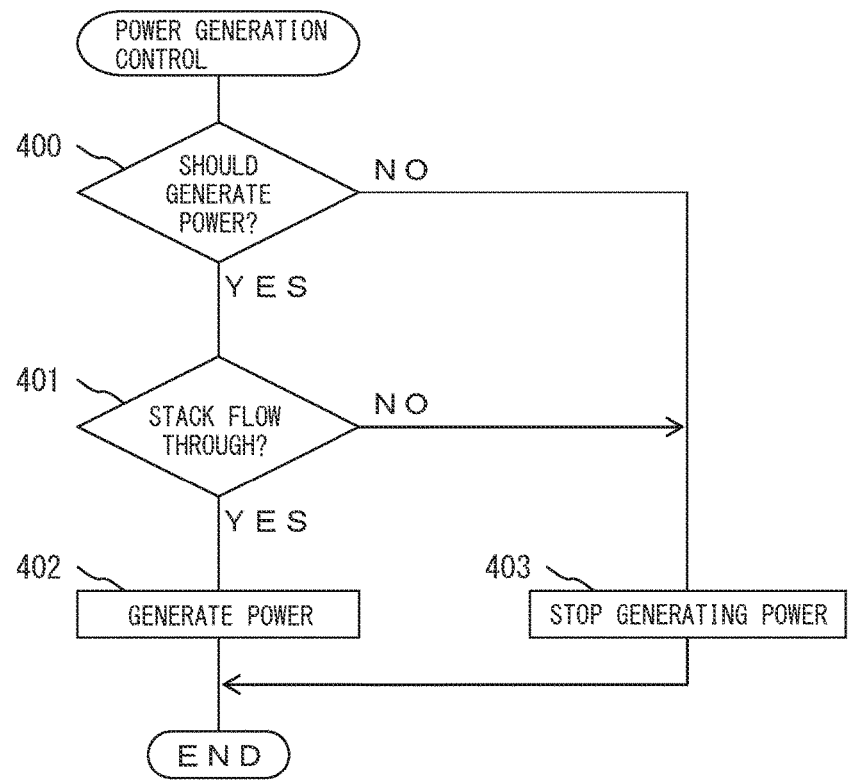
FIG. 15 is a flow chart for performing power generation control.

FIG. 15 shows a routine for performing the above-mentioned control of power generation of the fuel cell stack 10. This routine is executed by interruption at predetermined set time intervals.

Referring to FIG. 15, at step 400, it is judged if power should be generated at the fuel cell stack 10. If power should be generated at the fuel cell stack 10, that is, a signal for starting power generation at the fuel cell stack 10 is issued, the routine proceeds to step 401 where it is judged if the stack flow through mode is performed. If the stack flow through mode is performed, that is, if cooling water is flowing through the fuel cell stack 10, next, the routine proceeds to step 402 where power is generated at the fuel cell stack 10. That is, hydrogen gas and air are fed to the fuel cell stack 10. As opposed to this, if power is not to be generated at the fuel cell stack 10, that is, if the signal for starting power generation at the fuel cell stack 10 is not issued, the routine proceeds from step 400 to step 403. Further, if the stack flow through mode is not performed, that is, if the cooling water does not substantially flow through the fuel cell stack 10, the routine proceeds from step 401 to step 403. At step 403, the power generation at the fuel cell stack 10 is stopped. That is, the feed of hydrogen gas and air to the fuel cell stack 10 is stopped.

Figure 16:
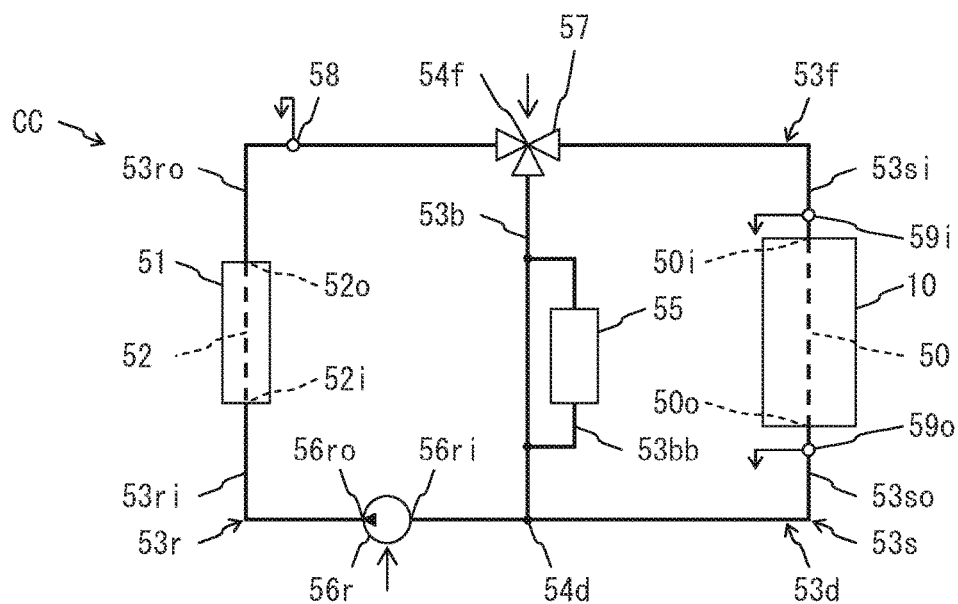
FIG. 16 is a schematic view of a cooling circuit of another embodiment according to the present invention.

FIG. 16 shows another embodiment according to the present invention. Compared with the embodiment shown in FIG. 1 and FIG. 2, in the embodiment shown in FIG. 16, the stack side cooling water pump is omitted. Therefore, the only cooling water pump provided at the stack side cooling water passage 53s, radiator side cooling water passage 53r, and bypass cooling water passage 53b is the radiator side cooling water pump 56r. As a result, the configuration of the cooling circuit CC can be simplified.

In the embodiment shown in FIG. 16, the radiator side cooling water pump 56r and bypass cooling water control valve 57 are controlled to selectively perform one of the stack flow through mode and the stack bypass mode. In this case, the stack flow through mode include at least one of the bypass-less mode and stack partial bypass mode. Further, the stack bypass mode includes the stack full bypass mode.

Figure 17:
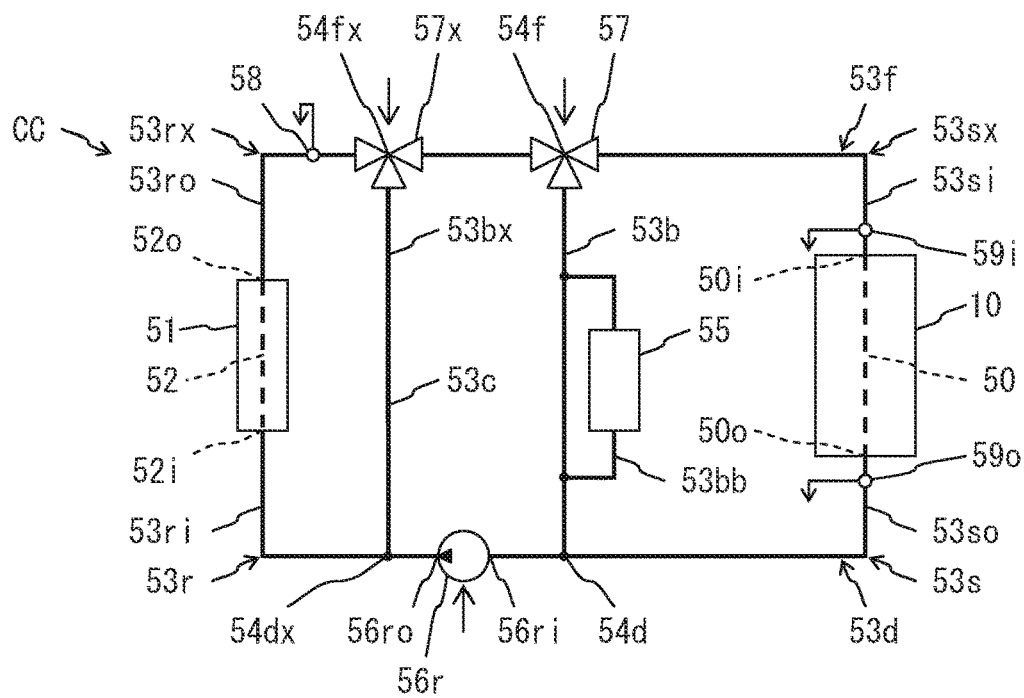
FIG. 17 is a schematic view of a cooling circuit of still another embodiment of the present invention.

FIG. 17 shows still another embodiment according to the present invention. Compared with the embodiment shown in FIG. 16, in the embodiment shown in FIG. 17, an additional bypass cooling water passage 53bx and additional bypass cooling water control valve 57x are further provided.

Specifically, an additional feed side branching point 54fx is provided at the cooling water feed passage 53f between the outlet 52o of the radiator inside cooling water passage 52 and the feed side branching point 54f, while an additional discharge side branching point 54dx is provided at the cooling water discharge passage 53d between the discharge side branching point 54d and the inlet 52i of the radiator inside cooling water passage 52. The additional bypass cooling water passage 53bx connects these additional feed side branching point 54fx and additional discharge side branching point 54dx together. A check valve is not provided inside the additional bypass cooling water passage 53bx. Therefore, cooling water can flow in both directions between the additional feed side branching point 54fx and the additional discharge side branching point 54dx. Further, a cooling water pump is not provided inside the additional bypass cooling water passage 53bx. Furthermore, a deionizer is also not provided inside the additional bypass cooling water passage 53bx. In another embodiment (not shown), an additional deionizer is provided inside the additional bypass cooling water passage 53bx.

Note that, in the embodiment shown in FIG. 17, cooling water passages positioned at the radiator 51 side with respect to the additional bypass cooling water passage 53bx, that is, the radiator inflow passage 53ri from the additional discharge side branching point 54dx to the inlet 52, of the radiator inside cooling water passage 52, the radiator inside cooling water passage 52, and the radiator outflow passage 53ro from the outlet 52o of the radiator inside cooling water passage 52 to the additional feed side branching point 54fx, can be considered to form another radiator side cooling water passage 53rx, while cooling water passages positioned at the fuel cell stack 10 side with respect to the additional bypass cooling water passage 53bx, that is, the radiator outflow passage 53ro from the additional feed side branching point 54fx to the feed side branching point 54f, the stack side cooling water passage 53s, and the radiator inflow passage 53ri from the discharge side branching point 54d to the additional discharge side branching point 54dx, can be considered to form another stack side cooling water passage 53sx. Furthermore, the bypass cooling water passage 53b, the radiator inflow passage 53ri from the discharge side branching point 54d to the additional discharge side branching point 54dx, the additional bypass cooling water passage 53bx, and the radiator outflow passage 53ro from the additional feed side branching point 54fx to the feed side branching point 54f can be considered to form a circulating cooling water passage 53c.

On the other hand, the additional bypass cooling water control valve 57x is configured to control an amount of cooling water flowing through the additional bypass cooling water passage 53bx. In the embodiment shown in FIG. 17, the additional bypass cooling water control valve 57x is formed from an electromagnetic type of three-way valve arranged at the additional feed side branching point 54fx.

Furthermore, in the embodiment shown in FIG. 17, the radiator side cooling water pump 56r is arranged in the radiator inflow passage 53ri between the discharge side branching point 54d and the additional discharge side branching point 54dx. In another embodiment (not shown), the radiator side cooling water pump 56r is arranged in the radiator outflow passage 53ro between the additional feed side branching point 54fx and the feed side branching point 54f.

Therefore, in the embodiment shown in FIG. 17, cooling water passages bypassing the fuel cell stack 10 and radiator 51 and connecting the cooling water feed passage 53f and the cooling water discharge passage 53d together are the bypass cooling water passage 53b and additional bypass cooling water passage 53bx. Further, in the embodiment shown in FIG. 17, the only cooling water pump making the cooling water flow is the radiator side cooling water pump 56r. In another embodiment (not shown), the cooling water pumps making the cooling water flow are the radiator side cooling water pump 56r and stack side cooling water pump 56s.

Now then, in the embodiment shown in FIG. 17, the radiator side cooling water pump 56r and bypass cooling water control valve 57 and additional bypass cooling water control valve 57x are controlled to thereby selectively perform one of the stack flow through mode and the stack bypass mode.

In the embodiment shown in FIG. 17, the stack flow through mode includes the bypass-less mode, stack partial bypass mode, second radiator full bypass mode, radiator full bypass-stack partial mode, and second radiator partial bypass mode. In another embodiment (not shown), the stack flow through mode includes any one, any two, any three, or any four of the bypass-less mode, stack partial bypass mode, second radiator full bypass mode, radiator full bypass-stack partial mode, and second radiator partial bypass mode. Therefore, if describing together the embodiment shown in FIG. 17 and this other embodiment (not shown), the stack flow through mode includes at least one of a bypass-less mode, stack partial bypass mode, second radiator full bypass mode, radiator full bypass-stack partial mode, and second radiator partial bypass mode.

Figure 18:
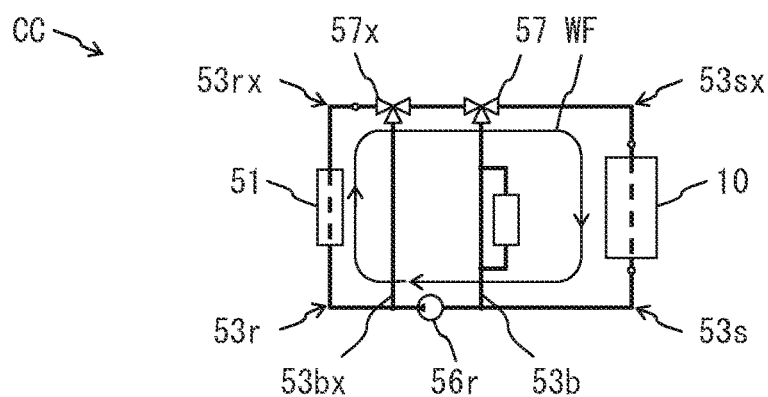
FIG. 18 is a schematic view of a cooling circuit explaining a bypass-less mode in the embodiment shown in FIG. 17.

In the bypass-less mode, as shown in FIG. 18, cooling water does not substantially flow through the bypass cooling water passage 53b and the additional bypass cooling water passage 53bx but circulates through the stack side cooling water passage 53s and the radiator side cooling water passage 53r. The bypass-less mode shown in FIG. 18 corresponds to the bypass-less mode shown in FIG. 6.

Figure 19:
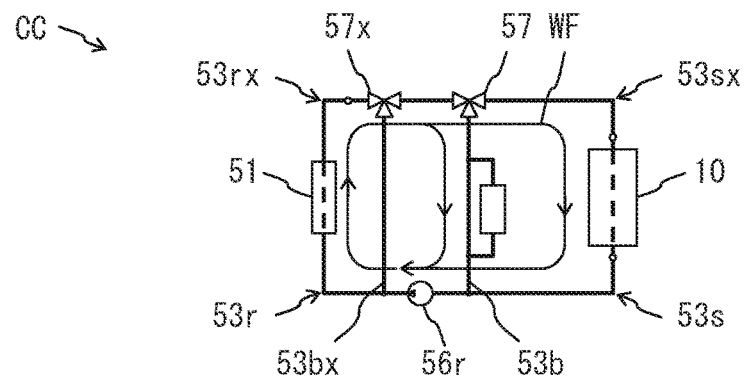
FIG. 19 is a schematic view of a cooling circuit explaining a stack partial bypass mode in the embodiment shown in FIG. 17.

In the stack partial bypass mode, as shown in FIG. 19, cooling water does not substantially flow through the additional bypass cooling water passage 53bx but flows through the stack side cooling water passage 53s while circulating through the radiator side cooling water passage 53r and the bypass cooling water passage 53b. The stack partial bypass mode shown in FIG. 19 corresponds to the stack partial bypass mode shown in FIG. 7.

Figure 20:
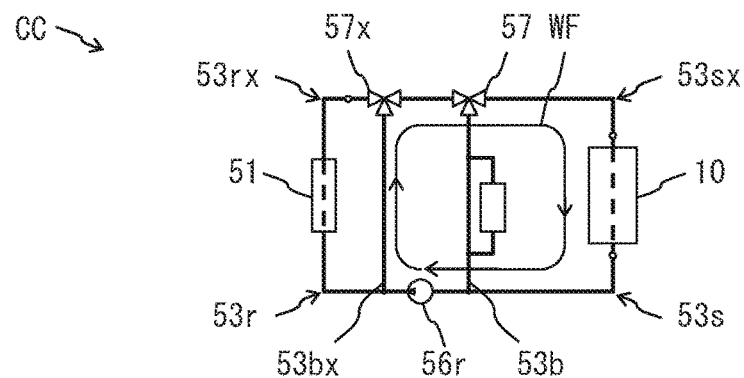
FIG. 20 is a schematic view of a cooling circuit explaining a second radiator full bypass mode shown in FIG. 17.

In the second radiator full bypass mode, as shown in FIG. 20, the cooling water does not substantially flow through the other radiator side cooling water passage 53rx and the bypass cooling water passage 53b but circulates through the additional bypass cooling water passage 53bx and the other stack side cooling water passage 53sx. The second radiator full bypass mode shown in FIG. 20 is similar to the radiator n full bypass mode shown in FIG. 4. However, in the second radiator full bypass mode shown in FIG. 20, the cooling water does not substantially flow through the bypass cooling water passage 53b and therefore does not substantially flow through the deionizer 55. Therefore, deterioration of the deionizer 55 due to the flow of cooling water is restricted.

Figure 21:
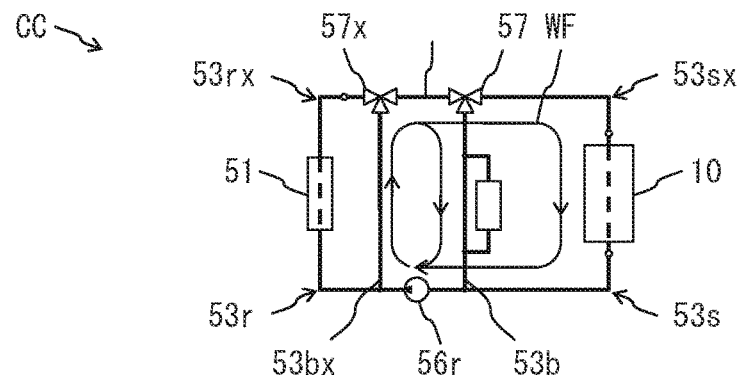
FIG. 21 is a schematic view of a cooling circuit explaining a radiator full bypass-stack partial mode in the embodiment shown in FIG. 17.

In the radiator full bypass-stack partial mode, as shown in FIG. 21, the cooling water does not substantially flow through the other radiator side cooling water passage 53rx but flows through the stack side cooling water passage 53s while circulating through the circulating cooling water passage 53c. The radiator full bypass-stack partial mode shown in FIG. 21 is similar to the radiator full bypass mode shown in FIG. 4. However, in the radiator full bypass-stack partial mode shown in FIG. 21, compared with the radiator full bypass mode shown in FIG. 4, an amount of cooling water sent to the fuel cell stack 10 is decreased.

Figure 22:
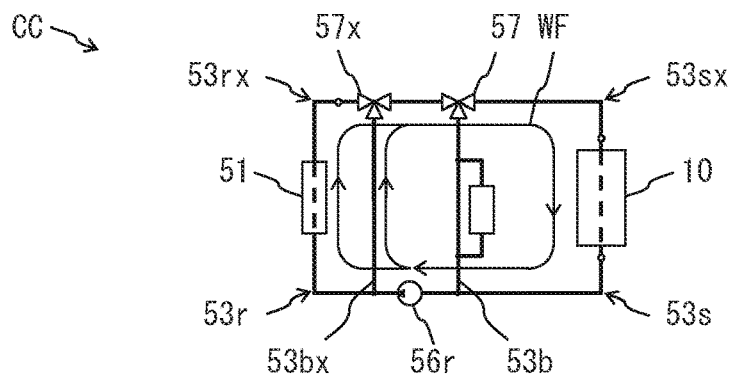
FIG. 22 is a schematic view of a cooling circuit explaining a second radiator partial bypass mode in the embodiment shown in FIG. 17.

In the second radiator partial bypass mode, as shown in FIG. 22, the cooling water does not substantially flow through the bypass cooling water passage 53b but flows through the other radiator side cooling water passage 53rx while circulating through the additional bypass cooling water passage 53bx and the other stack side cooling water passage 53sx. The second radiator partial bypass mode shown in FIG. 22 is similar to the radiator partial bypass mode shown in FIG. 5. However, in the second radiator partial bypass mode shown in FIG. 22, in the same way as the second radiator full bypass mode (FIG. 20), deterioration of the deionizer 55 is restricted.

Figure 23:
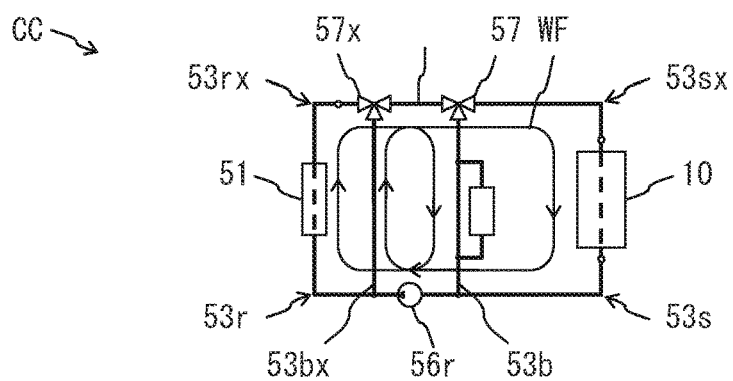
FIG. 23 is a schematic view of a cooling circuit explaining a radiator partial bypass stack partial bypass mode in the embodiment shown in FIG. 17.

In another embodiment (not shown), the stack flow through mode includes at least one of the bypass-less mode, stack partial bypass mode, second radiator full bypass mode, radiator full bypass-stack partial mode, second radiator partial bypass mode, and radiator partial bypass-stack partial bypass mode shown in FIG. 23. In the radiator partial bypass-stack partial bypass mode, the cooling water flows through the other radiator side cooling water passage 53rx and the stack side cooling water passage 53s while circulating through the circulating cooling water passage 53c.

On the other hand, in the embodiment shown in FIG. 17, the stack bypass mode includes the stack full bypass mode and the stack full bypass-radiator full bypass mode. In another embodiment (not shown), the stack bypass modes include one of the stack full bypass mode and stack full bypass-radiator full bypass mode. Therefore, if describing together the embodiment shown in FIG. 17 and this other embodiment (not shown), the stack bypass mode includes at least one of the stack full bypass mode and stack full bypass-radiator full bypass mode.

Figure 24:
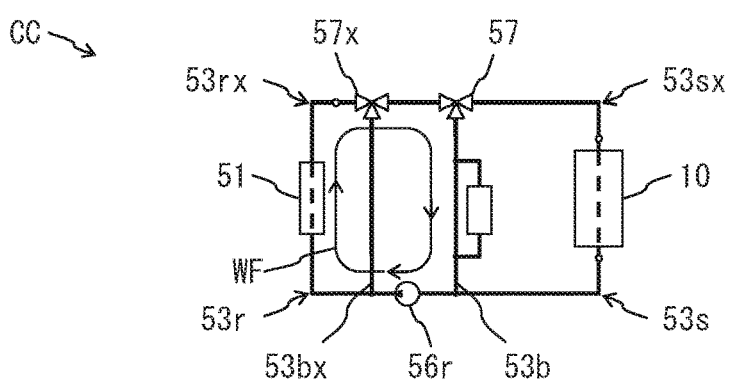
FIG. 24 is a schematic view of a cooling circuit explaining a stack full bypass mode in the embodiment shown in FIG. 17.

In the stack full bypass mode, as shown in FIG. 24, cooling water does not substantially flow through the stack side cooling water passage 53s and the additional bypass cooling water passage 53bx but circulates through the radiator side cooling water passage 53r and the bypass cooling water passage 53b. The stack full bypass mode shown in FIG. 24 corresponds to the stack full bypass mode shown in FIG. 3.

Figure 25:
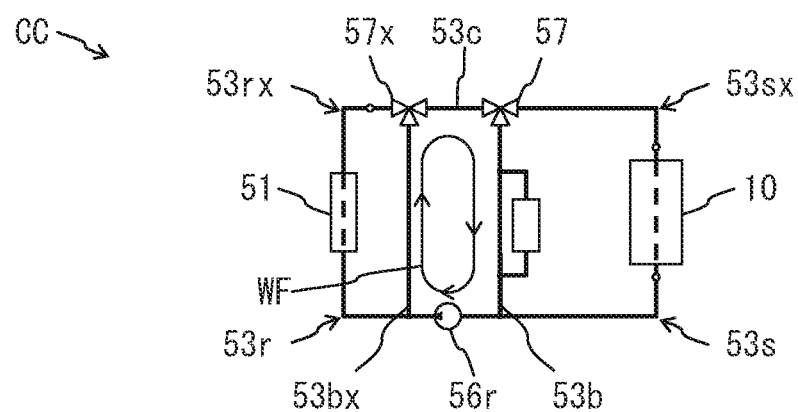
FIG. 25 is a schematic view of a cooling circuit explaining a stack full bypass-radiator full bypass mode in the embodiment shown in FIG. 17.

In the stack full bypass-radiator full bypass mode, as shown in FIG. 25, the cooling water does not substantially flow through the stack side cooling water passage 53s and the other radiator side cooling water passage 53rx but circulates through the circulating cooling water passage 53c. The stack full bypass-radiator full bypass mode shown in FIG. 25 is similar to the stack full bypass mode shown in FIG. 3. However, in the stack full bypass-radiator full bypass mode shown in FIG. 25, the cooling water does not substantially flow through the radiator 51, and thus the drop in temperature of the cooling water is restricted.

Now then, in the embodiment shown in FIG. 17 as well, the above-mentioned control during stoppage of power generation (FIG. 12), cooling water control (FIG. 13), start control (FIG. 14), and power generation control (FIG. 15) are performed. In this case, in FIG. 12 to FIG. 15, if the bypass-less mode should be performed (step 207 of FIG. 13), the bypass-less mode shown in FIG. 18 is performed. Further, in FIG. 12 to FIG. 15, if the stack partial bypass mode should be performed (step 209 of FIG. 13), the stack partial bypass mode shown in FIG. 19 is performed. In FIG. 12 to FIG. 15, if the radiator partial bypass mode should be performed (step 206 of FIG. 13), the second radiator partial bypass mode shown in FIG. 22 is performed.

In FIG. 12 to FIG. 15, if the radiator full bypass mode should be performed (step 203 of FIG. 13), the second radiator full bypass mode shown in FIG. 20 or the radiator full bypass-stack partial mode shown in FIG. 21 is performed. In this case, for example, if the electrical conductivity EC of the cooling water is lower than a predetermined reference value, the second radiator full bypass mode shown in FIG. 20 is performed, while if the electrical conductivity EC of the cooling water is higher than the predetermined reference rate, the radiator full bypass-stack partial mode shown in FIG. 21 is performed.

On the other hand, in FIG. 12 to FIG. 15, if the stack bypass mode should be performed (steps 103 and 106 of FIG. 12 and step 302 of FIG. 14), the stack full bypass mode shown in FIG. 24 or the stack full bypass-radiator full bypass mode shown in FIG. 25 is performed. In this case, for example, if the temperature of the cooling water or fuel cell stack 10 is higher than a predetermined reference temperature, the stack full bypass mode shown in FIG. 24 is performed, while if the temperature of the cooling water or fuel cell stack 10 is lower than the predetermined reference temperature, the stack full bypass-radiator full bypass mode shown in FIG. 25 is performed.

The present application claims the benefit of Japanese Patent Application No. 2015-081272, the entire disclosure of which is incorporated herein by reference.

REFERENCE SIGNS LIST

A. fuel cell system
10. fuel cell stack
50. stack inside cooling water passage
51. radiator
52. radiator inside cooling water passage
53*f*. cooling water feed passage
53*d*. cooling water discharge passage
53*si*. stack inflow passage
53*so*. stack outflow passage
53*ri*. radiator inflow passage
53*ro*. radiator outflow passage
53*s*. stack side cooling water passage
53*r*. radiator side cooling water passage
53*b*. bypass cooling water passage
54*f*. feed side branching point
54*d*. discharge side branching point
55. deionizer
56*s*. stack side cooling water pump
56*r*. radiator side cooling water pump
57. bypass cooling water control valve

The invention claimed is:

1. A fuel cell system comprising:
a fuel cell stack configured to generate electric power by an electrochemical reaction of a fuel gas and an oxidant gas;
a radiator configured to lower a temperature of cooling water for the fuel cell stack;
a cooling water feed passage connecting an outlet of a radiator inside cooling water passage in the radiator and an inlet of a stack inside cooling water passage in the fuel cell stack together and a cooling water discharge passage connecting an outlet of the stack inside cooling water passage and an inlet of the radiator inside cooling water passage together, the cooling water feed passage comprising a feed side branching point, a radiator outflow passage from the outlet of the radiator inside cooling water passage to the feed side branching point, and a stack inflow passage from the feed side branching point to the inlet of the stack inside cooling water passage, the cooling water discharge passage comprising a discharge side branching point, a stack outflow passage from the outlet of the stack inside cooling water passage to the discharge side branching point, and a radiator inflow passage from the discharge side branching point to the inlet of the radiator inside cooling water passage, the stack inflow passage, the stack inside cooling water passage, and the stack outflow passage forming a stack side cooling water passage, and the radiator inflow passage, the radiator inside cooling water passage, and the radiator outflow passage forming a radiator side cooling water passage;
a bypass cooling water passage connecting the feed side branching point and the discharge side branching point together, the bypass cooling water passage comprising a deionizer configured to remove ions in the cooling water;
a radiator side cooling water pump arranged in the radiator inflow passage so that an outlet thereof faces the radiator or arranged in the radiator outflow passage so that an inlet thereof faces the radiator;
a bypass cooling water control valve configured to control an amount of cooling water flowing through the bypass cooling water passage; and
a controller configured to control the radiator side cooling water pump and the bypass cooling water control valve to thereby selectively perform one of a stack flow through mode where cooling water flows through at least the stack side cooling water passage and a stack bypass mode where cooling water does not substantially flow through the stack side cooling water passage but flows through the bypass cooling water passage,
wherein the controller is configured to first of all perform the stack bypass mode and then perform the stack flow through mode at the time of start of power generation of the fuel cell stack.

2. The fuel cell system according to claim 1, wherein the only cooling water passage bypassing the fuel cell stack and the radiator to connect the cooling water feed passage and the cooling water discharge passage together is the bypass cooling water passage.

3. The fuel cell system according to claim 2, wherein the only cooling water pump making cooling water flow through is the radiator side cooling water pump.

4. The fuel cell system according to claim 3,
wherein the stack bypass mode includes a stack full bypass mode where cooling water does not substantially flow through the stack side cooling water passage but circulates through the radiator side cooling water passage and the bypass cooling water passage, and
wherein the stack flow through mode includes at least one of:
a bypass-less mode where cooling water does not substantially flow through the bypass cooling water passage but circulates through the stack side cooling water passage and the radiator side cooling water passage; and
a stack partial bypass mode where cooling water flows through the stack side cooling water passage while circulating through the radiator side cooling water passage and the bypass cooling water passage.

5. The fuel cell system according to claim 2, further comprising a stack side cooling water pump arranged in the stack inflow passage so that an outlet thereof faces the fuel cell stack or arranged in the stack outflow passage so that an inlet thereof faces the fuel cell stack.

6. The fuel cell system according to claim 5,
wherein the controller is configured to control the radiator side cooling water pump and the stack side cooling water pump and the bypass cooling water control valve to thereby selectively perform one of the stack bypass mode and the stack flow through mode, wherein the stack bypass mode includes a stack full bypass mode where cooling water does not substantially flow through the stack side cooling water passage but circulates through the radiator side cooling water passage and the bypass cooling water passage, and wherein the stack flow through mode includes at least one of:
- a bypass-less mode where cooling water does not substantially flow through the bypass cooling water passage but circulates through the stack side cooling water passage and the radiator side cooling water passage;
- a stack partial bypass mode where cooling water flows through the stack side cooling water passage while circulating through the radiator side cooling water passage and the bypass cooling water passage;
- a radiator full bypass mode where cooling water does not substantially flow through the radiator side cooling water passage but circulates through the stack side cooling water passage and the bypass cooling water passage; and
- a radiator partial bypass mode where cooling water flows through the radiator side cooling water passage while circulating through the stack side cooling water passage and the bypass cooling water passage.

7. The fuel cell system according to claim 1, wherein the system further comprises:
an additional bypass cooling water passage connecting together an additional feed side branching point provided in the cooling water feed passage between the outlet of the radiator inside cooling water passage and the feed side branching point and an additional discharge side branching point provided in the cooling water discharge passage between the discharge side branching point and the inlet of the radiator inside cooling water passage; and
an additional bypass cooling water control valve configured to control an amount of cooling water flowing through the additional bypass cooling water passage, and
wherein the radiator side cooling water pump is arranged inside the radiator inflow passage between the discharge side branching point and the additional discharge side branching point or inside the radiator outflow passage between the additional feed side branching point and the feed side branching point.

8. The fuel cell system according to claim 7, wherein the radiator inflow passage from the additional discharge side branching point to the inlet of the radiator inside cooling water passage, the radiator inside cooling water passage, and the radiator outflow passage from the outlet of the radiator inside cooling water passage to the additional feed side branching point form another radiator side cooling water passage, the radiator outflow passage from the additional feed side branching point to the feed side branching point, the stack side cooling water passage, and the radiator inflow passage from the discharge side branching point to the additional discharge side branching point form another stack side cooling water passage, and the bypass cooling water passage, the radiator inflow passage from the discharge side branching point to the additional discharge side branching point, the additional bypass cooling water passage, and the radiator outflow passage from the additional feed side branching point to the feed side branching point form a circulating cooling water passage,
wherein the controller is configured to control the radiator side cooling water pump and the bypass cooling water control valve and the additional bypass cooling water control valve to thereby selectively perform one of the stack bypass mode and the stack flow through mode, wherein the stack bypass mode includes at least one of:
- a stack full bypass mode where cooling water does not substantially flow through the stack side cooling water passage and the additional bypass cooling water passage but circulates through the radiator side cooling water passage and the bypass cooling water passage; and
- a stack full bypass-radiator full bypass mode where cooling water does not substantially flow through the stack side cooling water passage and the other radiator side cooling water passage but circulates through the circulating cooling water passage, and wherein the stack flow through mode includes at least one of:
- a bypass-less mode where cooling water does not substantially flow through the bypass cooling water passage and the additional bypass cooling water passage but circulates through the stack side cooling water passage and the radiator side cooling water passage;
- a stack partial bypass mode where cooling water does not substantially flow through the additional bypass cooling water passage but flows through the stack side cooling water passage while circulating through the radiator side cooling water passage and the bypass cooling water passage;
- a second radiator full bypass mode where cooling water does not substantially flow through the other radiator side cooling water passage and the bypass cooling water passage but circulates through the additional bypass cooling water passage and the other stack side cooling water passage;
- a radiator full bypass-stack partial mode where cooling water does not substantially flow through the other radiator side cooling water passage but flows through the stack side cooling water passage while circulating through the circulating cooling water passage; and
- a second radiator partial bypass mode where cooling water does not substantially flow through the bypass cooling water passage but flows through the other radiator side cooling water passage while circulating through the additional bypass cooling water passage and the other stack side cooling water passage.

9. The fuel cell system according to claim 1, wherein the system further comprises an electrical conductivity sensor arranged inside of the radiator side cooling water passage and configured to detect electrical conductivity of cooling water, and
wherein the controller is configured, at the time of start of power generation of the fuel cell stack, to detect electrical conductivity of cooling water by the electrical conductivity sensor and to first of all perform the stack bypass mode and then perform the stack flow through mode if the electrical conductivity of the cooling water is higher than a predetermined first set electrical conductivity, and to perform the stack flow through mode without performing the stack bypass mode if the electrical conductivity of the cooling water is lower than the first set electrical conductivity.

10. The fuel cell system according to claim 1, wherein the system further comprises an electrical conductivity sensor arranged in the radiator side cooling water passage and configured to detect electrical conductivity of cooling water, and
wherein the controller is configured, during stoppage of power generation of the fuel cell stack, to detect electrical conductivity of cooling water by the electrical conductivity sensor, and to temporarily perform the stack bypass mode if the electrical conductivity of the cooling water is higher than a predetermined set value.

11. A control method of a fuel cell system, the fuel cell system comprising:
a fuel cell stack configured to generate electric power by an electrochemical reaction of a fuel gas and an oxidant gas;
a radiator configured to lower a temperature of cooling water for the fuel cell stack;
a cooling water feed passage connecting an outlet of a radiator inside cooling water passage in the radiator and an inlet of a stack inside cooling water passage in the fuel cell stack together and a cooling water discharge passage connecting an outlet of the stack inside cooling water passage and an inlet of the radiator inside cooling water passage together, the cooling water feed passage comprising a feed side branching point, a radiator outflow passage from the outlet of the radiator inside cooling water passage to the feed side branching point and a stack inflow passage from the feed side branching point to the inlet of the stack inside cooling water passage, the cooling water discharge passage comprising a discharge side branching point, a stack outflow passage from the outlet of the stack inside cooling water passage to the discharge side branching point, and a radiator inflow passage from the discharge side branching point to the inlet of the radiator inside cooling water passage, the stack inflow passage, the stack inside cooling water passage, and the stack outflow passage forming a stack side cooling water passage, and the radiator inflow passage, the radiator inside cooling water passage, and the radiator outflow passage forming a radiator side cooling water passage;
a bypass cooling water passage connecting the feed side branching point and the discharge side branching point together, the bypass cooling water passage comprising a deionizer configured to remove ions in the cooling water;
a radiator side cooling water pump arranged in the radiator inflow passage so that an outlet thereof faces the radiator or arranged in the radiator outflow passage so that an inlet thereof faces the radiator;
a bypass cooling water control valve configured to control an amount of cooling water flowing through the bypass cooling water passage; and
a controller configured to control the radiator side cooling water pump and the bypass cooling water control valve,
the control method comprising controlling the radiator side cooling water pump and the bypass cooling water control valve by the controller to thereby selectively perform one of a stack flow through mode where cooling water flow through at least the stack side cooling water passage and a stack bypass mode where cooling water does not substantially flow through the stack side cooling water passage but flows through the bypass cooling water passage,
wherein the control method comprises controlling the radiator side cooling water pump and the bypass cooling water control valve by the controller to first of all perform the stack bypass mode and then perform the stack flow through mode at the time of start of power generation of the fuel cell stack.

* * * * *